(12) United States Patent
Bahrami et al.

(10) Patent No.: US 10,332,193 B2
(45) Date of Patent: Jun. 25, 2019

(54) INTERACTIVE DISPLAY SYSTEM FOR FOOD AND ENTERTAINMENT RETAIL ESTABLISHMENTS

(71) Applicant: SiRV Interactive, Inc., Torrance, CA (US)

(72) Inventors: Nima Bahrami, Rancho Palos Verdes, CA (US); Anthony Vernaglia, Anaheim Hills, CA (US); Kip Vernaglia, Anaheim Hills, CA (US)

(73) Assignee: Sirv Interactive, Inc., Bakersfield, CA (US)

( * ) Notice: Subject to any disclaimer, the term of this patent is extended or adjusted under 35 U.S.C. 154(b) by 0 days.

(21) Appl. No.: 14/521,102

(22) Filed: Oct. 22, 2014

(65) Prior Publication Data

US 2015/0046297 A1  Feb. 12, 2015

Related U.S. Application Data

(63) Continuation of application No. 14/327,126, filed on Jul. 9, 2014, now abandoned.
(Continued)

(51) Int. Cl.
*G06Q 30/00* (2012.01)
*G06Q 30/06* (2012.01)
(Continued)

(52) U.S. Cl.
CPC ....... *G06Q 30/0641* (2013.01); *G06F 3/0482* (2013.01); *G06F 3/0485* (2013.01);
(Continued)

(58) Field of Classification Search
CPC ............ G06Q 30/0641; G06Q 30/0601–30/08
(Continued)

(56) References Cited

U.S. PATENT DOCUMENTS

2006/0020497 A1* 1/2006 McNally ........................ 705/5
2007/0124323 A1* 5/2007 Hackworth et al. .......... 707/102
(Continued)

OTHER PUBLICATIONS

Cappa, M. J. (1933). Trends in the teaching of nutrition in secondary schools (Order No. EP57093). Available from ProQuest Dissertations and Theses Professional. (1625744259). Retrieved from http://search.proquest.com/professional/docview/1625744259?accountid=161862.*

(Continued)

*Primary Examiner* — Brittney N Miller
(74) *Attorney, Agent, or Firm* — Stetina Brunda Garred & Brucker

(57) ABSTRACT

The present disclosure describes an interactive menu display system providing retail establishments with a flexible electronic menu display that enables presentation of a large number of menu items by incorporating, among other things, a menu-item scrolling feature. The display system can be configured to subdivide a display system to include fields, such as physical portions of a display unit, or individual display units, that are designated for predetermined categories of menu items, and within those fields, the menu items may be sequentially displayed, such as in a scrolling, paging, or other step-wise fashion. The display system can also include a menu configuration user interface designed for the owner or manager of the retail establishment to conveniently and efficiently update menu content, layout, and other configuration settings. The display system can be configured to update the menu display in real-time based on updates to menu content and settings.

20 Claims, 22 Drawing Sheets

---

Pilsners & Pale Ales

1500 Pale Ale
Drake's Brewing
Hoppy Pale Ale
San Leandro, CA
5.5% ABV, 16 oz. $7.00

Thin Lizzy
Figueroa Mountain
XP
Buelton, CA
5.4% ABV, 16 oz. $7.00

Hoppy
9.6% ABV, 8oz. $8.00

Frogs Breath
Coronado Brewing Company
IPA
Coronado, CA
6.7% ABV, 8oz. $8.00

Go To IPA
Stone
Vibrant Session IPA
Escondido, CA

Wheat & Belgian

Escondido, CA
6% ABV, 8oz. $7.00

Raspberry Wheat
Mission Brewing
Wheat Brewed w/ real raspberries
San Diego, CA
5.2% ABV, 16 oz. $7.00

Brainless
Epic Brewing

Malty & Dark

Vicious Disposition
Ironfire Brewing
Imperial Porter
Temecula, CA
9% ABV, 8oz. $8.00

Speedway Stout
AleSmith Brewing
Imperial Coffee Stout
12.6% ABV, 8oz. $8.00

... Happy Hour M-F 5-7pm ... Ask about our rotating beer of the week ...

Related U.S. Application Data

(60) Provisional application No. 61/844,348, filed on Jul. 9, 2013.

(51) Int. Cl.

| | |
|---|---|
| *G06F 3/0482* | (2013.01) |
| *G06F 3/0484* | (2013.01) |
| *G06Q 50/12* | (2012.01) |
| *G06F 3/0485* | (2013.01) |
| *G06Q 30/02* | (2012.01) |
| *G06Q 50/00* | (2012.01) |

(52) U.S. Cl.
CPC ..... *G06F 3/04842* (2013.01); *G06Q 30/0241* (2013.01); *G06Q 30/0643* (2013.01); *G06Q 50/01* (2013.01); *G06Q 50/12* (2013.01)

(58) Field of Classification Search
USPC ........................................ 705/27.1, 26.1–27.2
See application file for complete search history.

(56) References Cited

U.S. PATENT DOCUMENTS

| | | | |
|---|---|---|---|
| 2007/0265935 A1* | 11/2007 | Woycik et al. ................. 705/26 |
| 2012/0116828 A1* | 5/2012 | Shannon ..................... 705/7.12 |
| 2013/0311310 A1* | 11/2013 | Zell ........................ G06Q 20/20 705/15 |
| 2013/0335328 A1* | 12/2013 | Greenhalgh ....... G06Q 30/0241 345/168 |
| 2014/0108621 A1* | 4/2014 | Bryan et al. .................. 709/219 |

OTHER PUBLICATIONS

How to Build HTML5 Layouts—Using QuickSign Pro, Jun. 19, 2014, https://web.archive.org/web/20140619172501/http://ds.celabs.net:80/index.php/content-management-software-using-quicksign-pro-v-700/html-layout-tutorials/restaurant-menus-layout/.*
Soenarie, Angelique, iPads replacing paper menus to pair wines with dishes, Apr. 20, 2012, Gannett Co., Inc. (Year: 2012).*
Visual Graphic Systems Introduces the Simplicity(TM) Digital Menu Board System, Jul. 18, 2012, PR Newswire Association LLC (Year: 2012).*

* cited by examiner

Salmon Sashimi (4 pcs)

Today's freshest catch straight from Alaska!

Limited supply, first come first served $10

Family Special

Sushi plate – Chef's assortment of sushi, sashimi, and rolls. Satisfaction guaranteed! Serves up to 4 people.

$50

Our Favorite Rolls

Always available classic rolls served with our modern twist.

| | |
|---|---|
| Dragon Roll | $9 |
| Spider Roll | $9 |
| Crunchy Roll | $10 |
| Rainbow Roll | $12 |
| California Roll | $8 |

Featured: Unagi Roll

Grill freshwater eel and avocado, drizzled with our house special ponzu sauce. If you haven't tried eel you are missing out!

$12

Yakitori

Assorted selection of meats and vegetables served skewer-style straight from the grill Ask your server for an order sheet!

$2-5 per skewer

Sake

| | |
|---|---|
| Okunomatsu | $4 |
| Kagatobi | $5 |
| Hananomai | $4 |
| Koshino Setsugatsuka | $5 |
| Kuro-Bin | $4 |

... Happy Hour M-F 5-7pm ... Buy One Get One ½ Off ... Today's Special ...

FIG. 2

KARAOKE NIGHT!

EVERY WEDNESDAY
FROM 9PM TO CLOSE IN THE LOUNGE

Enjoy $10 pitchers and $5 rolls

Reservations recommended – call 714-123-4567

Our Favorite Rolls

Always available classic rolls served with our modern twist.

| | |
|---|---|
| Dragon Roll | $9 |
| Spider Roll | $9 |
| Crunchy Roll | $10 |
| Rainbow Roll | $12 |
| California Roll | $8 |

Featured: Unagi Roll

*Grill freshwater eel and avocado, drizzled with our house special ponzu sauce. If you haven't tried eel you are missing out!*

$12

Yakitori

*Assorted selection of meats and vegetables served skewer-style straight from the grill*

*Ask your server for an order sheet!*

$2-5 per skewer

Sake

| | |
|---|---|
| Okunomatsu | $4 |
| Kagatobi | $5 |
| Hananomai | $4 |
| Koshino Setsugatsuka | $5 |
| Kuro-Bin | $4 |

... Happy Hour M-F 5-7pm ... Buy One Get One ½ Off ... Today's Special ...

FIG. 3

Pilsners & Pale Ales

1500 Pale Ale
Drake's Brewing
Hoppy Pale Ale
San Leandro, CA
5.5% ABV, 16 oz. $7.00

Thin Lizzy
Figueroa Mountain
XP
Buelton, CA
5.4% ABV, 16 oz. $7.00

Wheat & Belgian

Escondido, CA
6% ABV, 8oz. $7.00

Raspberry Wheat
Mission Brewing
Wheat Brewed w/ real raspberries
San Diego, CA
5.2% ABV, 16 oz. $7.00

Brainless
Epic Brewing

Hoppy 9.6% ABV, 8oz. $8.00

Frogs Breath
Coronado Brewing Company
IPA
Coronado, CA
6.7% ABV, 8oz. $8.00

Go To IPA
Stone
Vibrant Session IPA
Escondido, CA

Malty & Dark

Vicious Disposition
Ironfire Brewing
Imperial Porter
Temecula, CA
9% ABV, 8oz. $8.00

Speedway Stout
AleSmith Brewing
Imperial Coffee Stout
12.6% ABV, 8oz. $8.00

*… Happy Hour M-F 5-7pm … Ask about our rotating beer of the week …*

FIG. 4

INTERACTIVE DISPLAY SYSTEM FOR FOOD AND ENTERTAINMENT RETAIL ESTABLISHMENTS

CROSS-REFERENCE TO RELATED APPLICATIONS

The present application is a continuation of, and claims priority to, U.S. application Ser. No. 14/327,126, filed Jul. 9, 2014, which claims priority to provisional U.S. Pat. App. No. 61/844,348, filed on Jul. 9, 2013, the disclosures of which are hereby incorporated by reference herein in their entireties.

BACKGROUND

The present disclosure generally relates to interactive display systems which can be used in, for example but without limitation, food and entertainment industry retail establishments, such as restaurants, bars, clubs, etc. For example, some of the embodiments disclosed herein can be used in conjunction with electronic menu boards and/or point-of-sale systems used in restaurants or bars, as well as other types of entertainment establishments, such as dance clubs, etc.

Recently, electronic displays have become more widely used in retail establishments in the food and entertainment industry. For example, many restaurants and bars have adopted electronic menu displays for listing the available menu items and, optionally, their respective prices. Such systems allow the operators to change the items listed and/or their price. Additionally, some systems allow users to choose to alternate the display of menu items and advertisements.

SUMMARY

An aspect of at least one of the embodiments disclosed herein includes the realization that, in the context of some retail establishments in the food and/or entertainment industry, electronic display systems used for presenting lists of available selections, such as menu or bar selections, can be inadequate for displaying larger numbers of menu items. For example, some restaurants offer more menu items than can be displayed, simultaneously, on one or more display devices, such as commercially available televisions or video monitors. Similarly, some bars may offer a larger number of beverages, such as beers or microbrews, the particular list of which and pricing can change often. An aspect of at least one of the embodiments disclosed herein includes the realization that such electronic display systems can provide a user, such as a restaurant or bar manager, a convenient and simplified way of presenting a large number of menu items by incorporating a menu-item scrolling/paging feature. Optionally, the menu-item scrolling/paging feature can be associated with a list of menu items associated with categories and/or fields of the display system.

For example, in accordance with some embodiments disclosed herein, a display system can be configured to display menu items in a scrolling, paging, or other transitional fashion (e.g. fading in/out effects, boxing in/out effects, blinding effects, checkerboard effects, etc.). In an example of an environment of use, such as a bar, a display system can be configured to scroll or page through a list of beers, microbrews or other beverages that are available, where the list of those beverages is sufficiently long that they cannot reasonably be displayed simultaneously on the display system. Thus, some of the menu items are displayed while moving up or across a display unit, and other menu items are cached and are sequentially displayed in a scrolling, paging, or other transitional/step-wise fashion.

Further, in accordance with some embodiments, a display system can be configured to subdivide a display system so as to include fields, such as physical portions of a display unit, or individual display units, that are designated for predetermined categories of menu items, and within those fields, the menu items are sequentially displayed, such as in a scrolling, paging, or other transitional/step-wise fashion within areas of the display system dedicated to respective categories. Further, in some embodiments, a plurality of areas of the display system can be dedicated to a plurality of categories and including displayed titles associated with those categories, respectively, and can be configured to display and scroll/page menu items in those categories simultaneously, while the titles of the categories remain persistent during the scrolling/paging. Thus, a customer can more easily monitor a designated field of a display system and watch the scrolling/paging list of menu items so as to eventually see all of the available menu items, and in some embodiments, monitor multiple categories simultaneously.

Further, by incorporating at least two or more fields of the display system designated for respective two or more categories of menu items, a plurality of customers can simultaneously monitor the fields associated with two different categories of menu items with the various menu items scrolling, paging, or otherwise being changed therein.

The display system can also include a convenient user interface designed to allow a user to insert menu items into predetermined fields on the display system, which may be associated with various categories of menu items. The user interface can include predefined user templates and/or other features for conveniently changing menu items and/or other information displayed on the display system.

Further, the display system can allow for fields on the display unit or units to be reserved for other types of information, either scrolled or static, such as messages from social media websites and/or social media networks, including Facebook, Twitter, Instagram, instant messages, microblogs, embedded videos, etc.

A video display system can also be configured for listing a line-up, for example, of performers scheduled to perform. For example, in some types of entertainment establishments, dancers, comedians or other types of entertainers may take the stage in a sequential order. Some customers appreciate advance notice of the different performers that are scheduled to perform, and optionally statistical or personal information regarding each of those performers. Optionally, the display system can also display the estimated time until each of the sequential performers will take the stage.

These, as well as other features, aspects, embodiments and advantages of the display systems are further described below and illustrated in connection with various embodiments, with reference to the accompanying drawings. The illustrated embodiments, however, are merely examples and are not intended to be limiting.

BRIEF DESCRIPTION OF THE DRAWINGS

FIG. 2 is an example menu display user interface presenting a menu of items available at a retail establishment, as used in an embodiment.

FIG. 3 is another example menu display user interface presenting a menu of items available at a retail establishment, as used in an embodiment.

FIG. 4 is example menu display user interface presenting a menu of drinks available at a retail establishment, as used in an embodiment.

DETAILED DESCRIPTION

Figure 1:
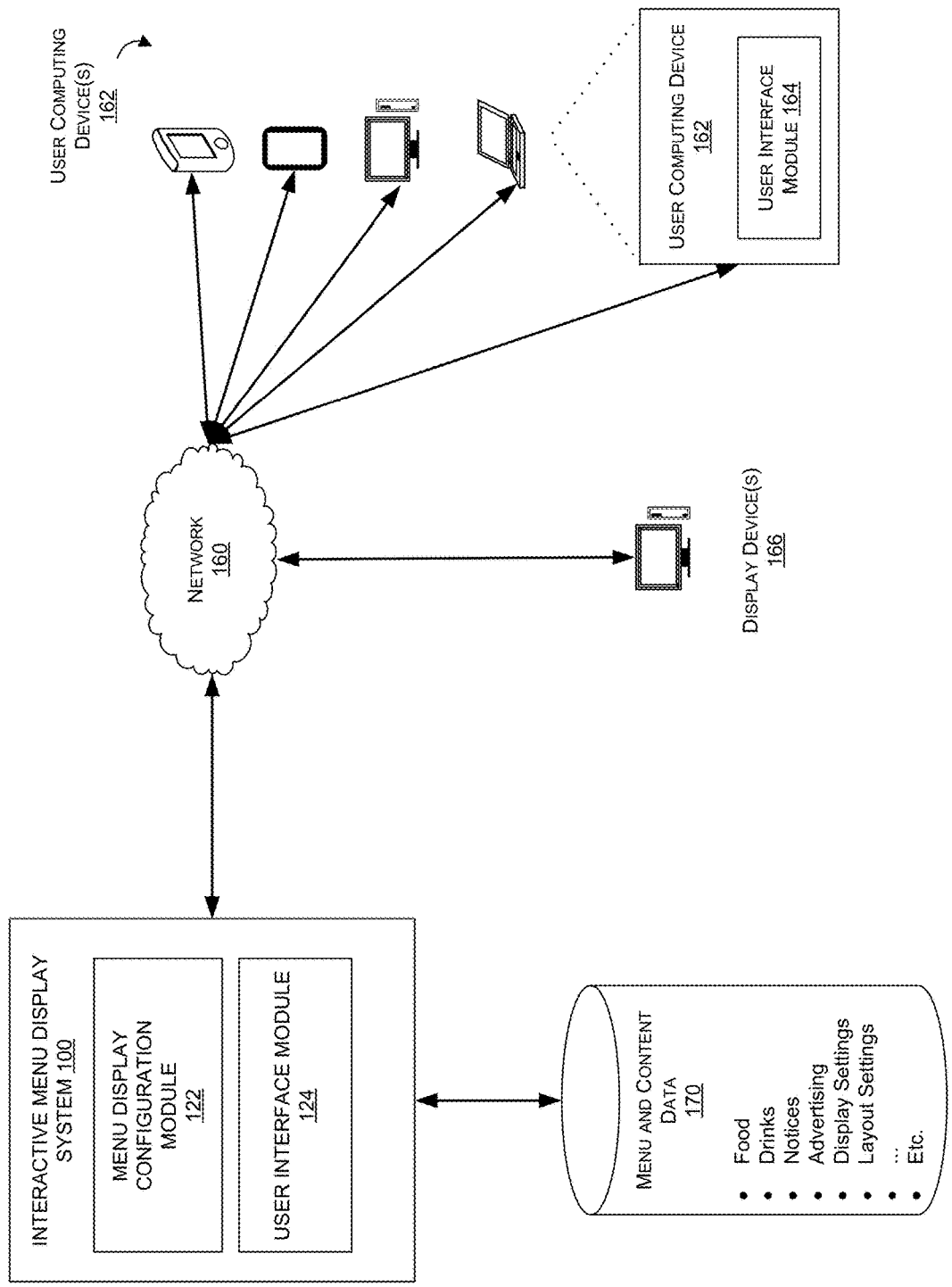
FIG. 1 is a block diagram depicting an illustrative network environment in which an interactive menu display system may operate.

FIG. 1 is a general architecture diagram schematically illustrating an example of an interactive menu display system 100 that performs and provides the menu display and menu configuration services described herein. The interactive menu display system 100 can include any system capable of performing the processes described herein. For example, in the illustrated embodiment of FIG. 1, the interactive menu display system 100 communicates with one or more user computing devices 162 and one or more display devices 166 over a network 160. In FIG. 1, the interactive menu display system 100 includes several components such as a menu display configuration module 122 and user interface module 124. These components may also include further components that may not be depicted in FIG. 1. For example, interactive menu display system 100 can also include one or more servers, e.g., a web server, configured to receive and respond to requests from the user computing devices 162.

The menu display configuration module 122 may be configured to, for example, manage various aspects of configuring a menu for a retail establishment. The menu display configuration module 122 may operate in conjunction with a user interface module 124 configured to generate and provide various menu configuration user interfaces described herein to enable the owner or manager to edit the menu, including menu content (e.g., food and drinks available at the retail establishment), notices (e.g., informational items), advertising content (e.g., banner advertisements, in-menu advertisements, etc.), and presentation settings including display and layout settings, font styles and alignments, and the like. Among other things, the menu display configuration module 122 and/or user interface module 124 may be configured to execute various processes, such as the process 1100 described with reference to FIG. 11, and the process 1200 described with reference to FIG. 12.

Also shown in FIG. 1, the interactive menu display system 100 may include and/or have access to one or more data stores or data sources including, for example, a menu and content data store 170. The menu and content data store 170 may include data for the interactive menu display system, such as information or data about menu items available at a retail establishment including food and drinks; notices including information about upcoming events, special offers for the retail establishment, information about performers and performance schedules, and the like; advertising content, including ads for the retail establishment and/or ads for related products or services which may be displayed on the menu display user interfaces in exchange for a service fee; data related to display settings and/or layout settings for the menu display user interfaces; images and other display content for the menu; and so forth. The menu and content data store 170 may store data provided by the owner and manager, either via the menu configuration user interfaces described herein or via other processes (e.g., an initial setup process or routine may be implemented to create or generate initial or default menu content which may then be further edited by the owner or manager using the menu configuration user interfaces). The menu and content data store 170 may store data provided by or accessed from a third party entity, such as a third party data source of menu content including food, drinks (e.g., a database of information regarding one or more craft beers, such as a database provided by TapHunter or other services).

Also shown in FIG. 1, a sample user computing device 162 may include a user interface module 164 which may be configured to execute some or all of the processes described herein. This may, for example, enable the user computing device 162 to provide the menu display and/or menu configuration features to the user of the device, even when the device may be not connected to the interactive menu display system 100 over the network 160. This may be the case, for example, if the user computing device 162 does not have wireless access, may not be connected to a cellular network, and so forth. In some embodiments, the interactive menu display system 100 may be a web-based system that may be accessed by users using an ordinary web browser. The interactive menu display system 100 may be accessible by an owner, manager, server, or other employee of the retail establishment to perform the menu configuration functions described herein. In other embodiments, aspects of the interactive menu display system 100 may also be accessible by users not associated with the retail establishment (e.g., customers of the retail establishment) who may be able to view a menu and optionally place orders (e.g., by placing an order with a server or by placing an order directly via a user computing device), but may not have access to the menu configuration functions provided by the interactive menu display system.

The user interface module 124 of the interactive menu display system 100 may be configured to, for example, generate one or more user interfaces, such as the user interfaces described herein (e.g., FIGS. 2-17), to provide the menu configuration features to the user of a computing device 162. In one embodiment, some or all of the user interfaces and/or UI elements may be generated either by the interactive menu display system 100 and provided to the user computing device 162, or they may be generated on the user computing device 162 via the user interface module 164, or in some combination thereof.

According to one example use case scenario, a retail establishment may have one or more display devices 166, such as commercial televisions or video monitors, to enable display of a menu of items and information for the retail establishment. For example, one display device 166 may enable display of a food menu, another display device 166 may enable display of a drinks menu, and yet another display device 166 may enable display of notices, advertisements, or other information. Of course, any combination may be possible (e.g., one display device 166 may display food and drinks, along with notices and advertising in any combination) using one, two, three, or more display devices 166. The display devices 166 may present one or more menu display user interfaces which are generated by the interactive menu display system 100 based at least in part on menu data accessed from the menu and content data store 170.

An owner or manager of a retail establishment may access the menu configuration user interfaces using a user computing device 162, The user computing device 162 may be, for example, a smart phone or tablet available to the owner, manager, or other employees at the retail establishment, or the user computing device 162 may be located elsewhere in a location remote from the retail establishment (e.g., the owner may be able to access the menu configuration user interfaces from home or anywhere else).

Example Menu Display User Interfaces

FIGS. 2, 3, 4, and 5 illustrate example user interfaces presenting various portions or aspects of a menu for a retail establishment, as used in one or more embodiments of the interactive menu display system. The sample user interfaces may be displayed, for example, on one or more display devices 166, such as commercially available televisions or video monitors. However, in some embodiments, the sample user interfaces shown in FIGS. 2, 3, 4, and 5 may also be displayed on any suitable user computer device, such as a cell/smart phone, tablet, portable/mobile computing device, desktop, laptop, or personal computer, and are not limited to the samples as described herein. In some embodiments the sample user interfaces may be displayed using a web browser (e.g., as a web page), a mobile application, or a standalone application. The user interfaces include examples of only certain features that an interactive menu display system may provide. In other embodiments, additional features may be provided, and they may be provided using various different user interfaces and software code.

Depending on the embodiment, the user interfaces and functionality described with reference to FIGS. 2, 3, 4, and 5 may be provided by software executing on the one or more display devices; by software executing on an optional intermediary computing system in communication with the one or more display devices; by an interactive menu display system located remotely that is in communication with the one or more display devices directly or indirectly via one or more networks; and/or some combination of software executing on the one or more display devices, the optional intermediary computing system, and the interactive menu display system. In other embodiments, analogous interfaces may be presented using audio or other forms of communication. In an embodiment, the interfaces shown in FIGS. 2, 3, 4, and 5 are configured to be interactive and respond to various user interactions. Such user interactions may include clicks with a mouse, typing with a keyboard, touches and/or gestures on a touch screen, voice commands, physical gestures made within a proximity of a user interface, and/or the like.

FIG. 2 is an example menu display user interface ("UI") 200 presenting a menu of items available at a retail establishment, in particular a sushi and yakitori restaurant. The example menu display UI 200 may be generated by the interactive menu display system 100 according to menu and content data accessed from the menu and content data store 170. The menu display UI 200 may comprise or include one or more portions to present one or more respective menu items and/or submenus. The example menu display UI 200 of FIG. 2 includes six portions arranged in two rows and three columns; however, other configurations may be possible and customized by the owner or manager of the retail establishment, for example via the menu configuration user interfaces provided by the interactive menu display system 100 (e.g., FIG. 8). Thus, for example, the example menu display UI 200 may be configured or customized to present a menu in one portion (e.g., a portion which utilizes most of the display area), two portions (e.g., one row by two columns, or two rows by four columns), four portions (e.g., two rows by two columns, one row by four columns, or four rows by one column), and so on in any other combination.

As shown in FIG. 2, each respective portion of the menu display UI 200 may present a menu item, along with a description, a price, and/or an image for the menu item; or, reach respective portion may present a submenu, such as the "Favorite Rolls" submenu or the "Sake" drinks menu. Each submenu may be configured in a similar manner as described herein with reference to configuring the one or more menu items to be presented in the menu display UI. Each submenu may also be configured to use a pre-generated image or graphic which includes the relevant submenu items, such that the pre-generated image or graphic may be included in a respective portion of the menu.

In some embodiments, certain portions of the menu may include content which may not entirely fit within the display area of the respective portion of the menu display UI. For example, a common scenario occurs when a drinks menu or submenu includes more available drinks than can concurrently be displayed in the corresponding portion of the menu display (e.g., the portion of the menu display may have sufficient display area to display up to ten available drink items at one time, but the entire drinks menu may include more than ten drinks). In such cases the menu display UI may be generated to enable automatic scrolling, paging, and/or other transitional rotation of the content within the respective portion, thereby updating the menu display UI in real-time to replace displayed menu content with other menu content that is not concurrently displayed. This way the entire contents of the menu may be displayed over a period of time, enabling the customer to view the entire menu or submenu contents in a single menu display UI. In other embodiments, instead of automatic scrolling, menu content may be periodically rotated or switched to update the menu display UI to present the entire menu or submenu contents in timed segments. For example, a drinks menu or submenu may rotate through a display pattern of showing a first set of ten drinks, followed by a second set of ten drinks, and so on until all available drinks in the menu or submenu have been presented, at which point the display pattern may be repeated. The pattern may be configured to present each timed segment for a default or a user defined period of time (e.g., 3 seconds, 5 seconds, etc.).

The example menu display UI 200 also includes a ticker UI element 202 for displaying a scrolling, paging, or otherwise automatically updating ticker of content. Although illustrated at the bottom of the menu display UI 200, the ticker UI element 202 may be presented in any position including across the top, the middle, on the left or right side of the UI. The ticker UI element 202 may be configured using for example the ticker configuration UI illustrated and described with reference to FIGS. 11, 12, and 13 herein. For example, the ticker UI element 202 may be configured to display a "live" or real-time data feed from social media websites and/or social media networks, including Facebook, Twitter, Instagram, micro-blogs, and the like; and/or to display one or more user-defined messages which may be presented via the ticker UI element 202 in a rotating pattern.

In one embodiment, the menu display UI 200 is configured to update or refresh periodically in near real-time in order to display the most current menu content and configuration settings. In another embodiment, the menu display UI 200 is configured to update or refresh responsive to detection of or receipt of new or updated menu content and configuration settings. In either such embodiment, the menu content and configuration settings may be updated, for example, by the owner or manager of the retail establishment via the one or more menu configuration user interfaces described herein. In this way for example, the owner or manager may update the menu to add new items or to delete items no longer available, and the interactive menu display system 100 may generate and updated menu display UI 200 to be refreshed in near real-time. This way the owner or operator may be assured that the most current menu is displayed within the retail establishment based on "up-to-minute" changes to the menu or items available. One benefit to such an updated menu display is that it may prevent the customer from ordering an item that is no longer available, thus preventing the undesirable customer service outcome of having to inform the customer manually that an item she ordered is not available.

FIG. 3 is another example menu display user interface ("UI") 300 presenting a menu of items available at a retail establishment, in particular a sushi and yakitori restaurant. The example menu display UI 300 may be generated by the interactive menu display system 100 according to menu and content data accessed from the menu and content data store 170. Menu display UI 300 includes an example of a banner UI element 302 which may be included with the menu content. The banner UI element may be configured using for example the banner configuration UI illustrated and described with reference to FIG. 14 herein. For example, the banner UI element 302 may be configured to display custom content such as notices or informational content regarding upcoming events (e.g., "Karaoke Night! . . . "), special offers (e.g., "Enjoy $10 pitchers and $5 rolls"), and other information (e.g., "Reservations recommended . . . "). Other types of custom content may also be included for display including, for example, advertisements or special offers from other retail establishments or businesses. For example, custom content may include an advertisement from a nearby retail establishment offering patrons a discount other special offer (e.g., "Show your receipt from this retail establishment and receive 10% your next order at Nearby Retail Establishment!").

As shown in FIG. 3, banner UI element 302 is displayed in the upper left corner and configured to overlay two portions of the underlying menu. However, banner UI element 302 may be configured for display in any number of ways, including for example overlaying the entire menu display, overlaying one or more respective portions of the menu display, aligned with the right edge or bottom edge of the menu display, and so on. Further, in some embodiments the banner UI element 302 may be configured for display on a set interval (e.g., show or display for 5 seconds, hide or not display for 10 seconds, repeat), such that the banner UI element 302 and corresponding custom content may only be displayed periodically.

FIG. 4 is example menu display user interface ("UI") 400 presenting a menu of drinks available at a retail establishment. The example menu display UI 400 may be generated by the interactive menu display system 100 according to menu and content data accessed from the menu and content data store 170. The menu display UI 400 may comprise or include one or more portions to present one or more respective drink categories and drink lists. The example menu display UI 400 of FIG. 4 includes four portions arranged in two rows and two columns; however, other configurations may be possible and customized by the owner or manager of the retail establishment, for example via the menu configuration user interfaces provided by the interactive menu display system 100 (e.g., FIG. 8 or a similar user interface for configuration of a drinks menu).

In some embodiments, some the drink categories may include content which may not entirely fit within the display area of the respective portion of the menu display UI. For example, a brewery or bar often offers dozens or even hundreds of different beer brews which may not concurrently be displayed in the menu display, or may not concurrently be displayed in the menu display and remain legible or viewable by the customer. In such cases the menu display UI 400 may be generated to enable automatic scrolling, paging, other transitional change of the content within each respective portion, thereby updating the menu display UI in real-time to replace displayed available drinks with other menu content that is not concurrently displayed. This way the entire contents of the drinks menu may be displayed over a period of time, enabling the customer to view a legible or readable presentation of the entire drinks menu a single menu display UI. In other embodiments, instead of automatic scrolling, drinks menu content may be periodically rotated or switched to update the menu display UI to present the entire drinks menu or submenu contents in timed segments. For example, a drinks menu or submenu may rotate through a display pattern of showing a first set of ten drinks, followed by a second set of ten drinks, and so on until all available drinks in the menu or submenu have been presented, at which point the display pattern may be repeated. The pattern may be configured to present each timed segment for a default or a user defined period of time (e.g., 3 seconds, 5 seconds, etc.). In one embodiment, each respective drink category and corresponding portion of the menu display UI 400 may be configured to scroll or rotate content independently of each other, enabling concurrent display of multiple scrolling or rotating lists of drinks organized by the respective categories, which may be identified with names or titles (e.g., Pilsners and Pale Ales, Hoppy, Wheat and Belgian, Malty and Dark, of FIG. 4). In some embodiments, the names or titles (e.g., Pilsners and Pale Ales, Hoppy, Wheat and Belgian, Malty and Dark, of FIG. 4) can be displayed persistently during all or a portion of the scrolling or paging sequence. Thus, the names of individual beverages such as "1500 Pale Ale" and "Thin Lizzy" within the "Pilsners & Pale Ales" category, can scroll or page with those and other beverage names, while the name of the category "Pilsners & Pale Ales" is displayed persistently during such scrolling or paging, for example, at the top or other part of the portion of the menu display dedicated to the "Pilsners & Pale Ales" category. In some embodiments, the portion of the menu display dedicated to the "Pilsners & Pale Ales" category can be further subdivided into a scrolling/paging portion and a persistent portion, such that the category name "Pilsners & Pale Ales" is displayed in the persistent portion and the beverage names are displayed in the scrolling/paging portion.

Similarly to the embodiment shown and described in FIG. 3, the menu display UI 400 may be configured to update or refresh periodically in near real-time in order to display the most current drink menu content and configuration. In another embodiment, the menu display UI 400 is configured to update or refresh responsive to detection of or receipt of new or updated menu content and configuration settings. In such embodiments, the menu content and configuration settings may be updated, for example, by the owner or manager of the retail establishment via the one or more menu configuration user interfaces described herein. In this way for example, the owner or manager may update the menu to add new drink items or to delete drink items no longer available (e.g., if a certain craft beer on tap has run out), and the interactive menu display system 100 may generate and update menu display UI 200 to be refreshed in near real-time. This way the owner or operator may be assured that the most current menu is displayed within the retail establishment based on "up-to-minute" changes to the menu or items available.

Although not illustrated in FIG. 4, the menu display UI 400 may also be configured similarly to the menu display UI 300 of FIG. 3 to enable display or presentation of a banner UI element. Each of the features described with reference to FIG. 3 may also be included in the menu display UI 400 of FIG. 4.

Figure 5:
FIG. 5 is example menu display user interface presenting a display of notices for a retail establishment, as used in an embodiment.

FIG. 5 is example menu display user interface ("UI") 500 presenting a display of notices for a retail establishment. The example menu display UI 500 may be generated by the interactive menu display system 100 according to menu and content data accessed from the menu and content data store 170. The menu display UI 500 may comprise or include one or more portions to present one or more respective notices, such as a listing of performers and related performance information and/or advertising. The example menu display UI 500 of FIG. 5 includes four portions arranged in four rows and one column; however, other configurations may be possible and customized by the owner or manager of the retail establishment, for example via the menu configuration user interfaces provided by the interactive menu display system 100 (e.g., FIG. 8 or a similar user interface for configuration of a notice menu).

As shown in FIG. 5, the notice information display includes a listing of performers and related information, such as a performance time, a stage location, and a description. For example, in some establishments providing live entertainment, dancers, comedians or other types of entertainers may take the stage in a sequential order. Some customers appreciate advance notice of the different performers that are scheduled to perform, and optionally statistical or personal information regarding each of those performers. Optionally, the display system can also display the estimated time until each of the sequential performers will take the stage.

Similarly to the embodiments shown and described in FIGS. 3 and 4, the menu display UI 500 may be configured to update or refresh periodically in near real-time in order to display the most notice content and configuration settings. Thus, for example, the owner or manager may update the menu display to add new notice items or to delete notice items no longer needed or relevant (e.g., a performance schedule may be updated throughout the day and thus menu display information about scheduled performers may need to be updated accordingly), and the interactive menu display system 100 may generate and update menu display UI 500 to be refreshed in near real-time. This way the owner or operator may be assured that the most current notice information is displayed within the retail establishment based on "up-to-minute" changes to the related information, such as performer replacements, scheduling changes, and the like.

Although not illustrated in FIG. 5, the menu display UI 500 may also be configured similarly to the menu display UI 300 of FIG. 3 to enable display or presentation of a banner UI element. Each of the features described with reference to FIG. 3 may also be included in the menu display UI 500 of FIG. 5.

Example Menu Configuration User Interfaces

FIGS. 6-17 illustrate example menu configuration user interfaces, as used in one or more embodiments of the interactive menu display system. The sample user interfaces may be displayed, for example, on a user computing device 162 via a web browser (e.g., as a web page), a mobile application, or a standalone application. However, in some embodiments, the sample user interfaces shown in FIGS. 6-17 may also be displayed on any suitable computer device, such as a cell/smart phone, tablet, portable/mobile computing device, desktop, laptop, or personal computer, and are not limited to the samples as described herein. The user interfaces include examples of only certain features that an interactive menu display system may provide. In other embodiments, additional features may be provided, and they may be provided using various different user interfaces and software code.

Depending on the embodiment, the user interfaces and functionality described with reference to FIGS. 6-17 may be provided by software executing on the user computing device, by an interactive menu display system located remotely that is in communication with the computing device via one or more networks, and/or some combination of software executing on the computing device and the interactive menu display system. In other embodiments, analogous interfaces may be presented using audio or other forms of communication. In an embodiment, the interfaces shown in FIGS. 6-17 are configured to be interactive and respond to various user interactions. Such user interactions may include clicks with a mouse, typing with a keyboard, touches and/or gestures on a touch screen, voice commands, physical gestures made within a proximity of a user interface, and/or the like.

Figure 6:
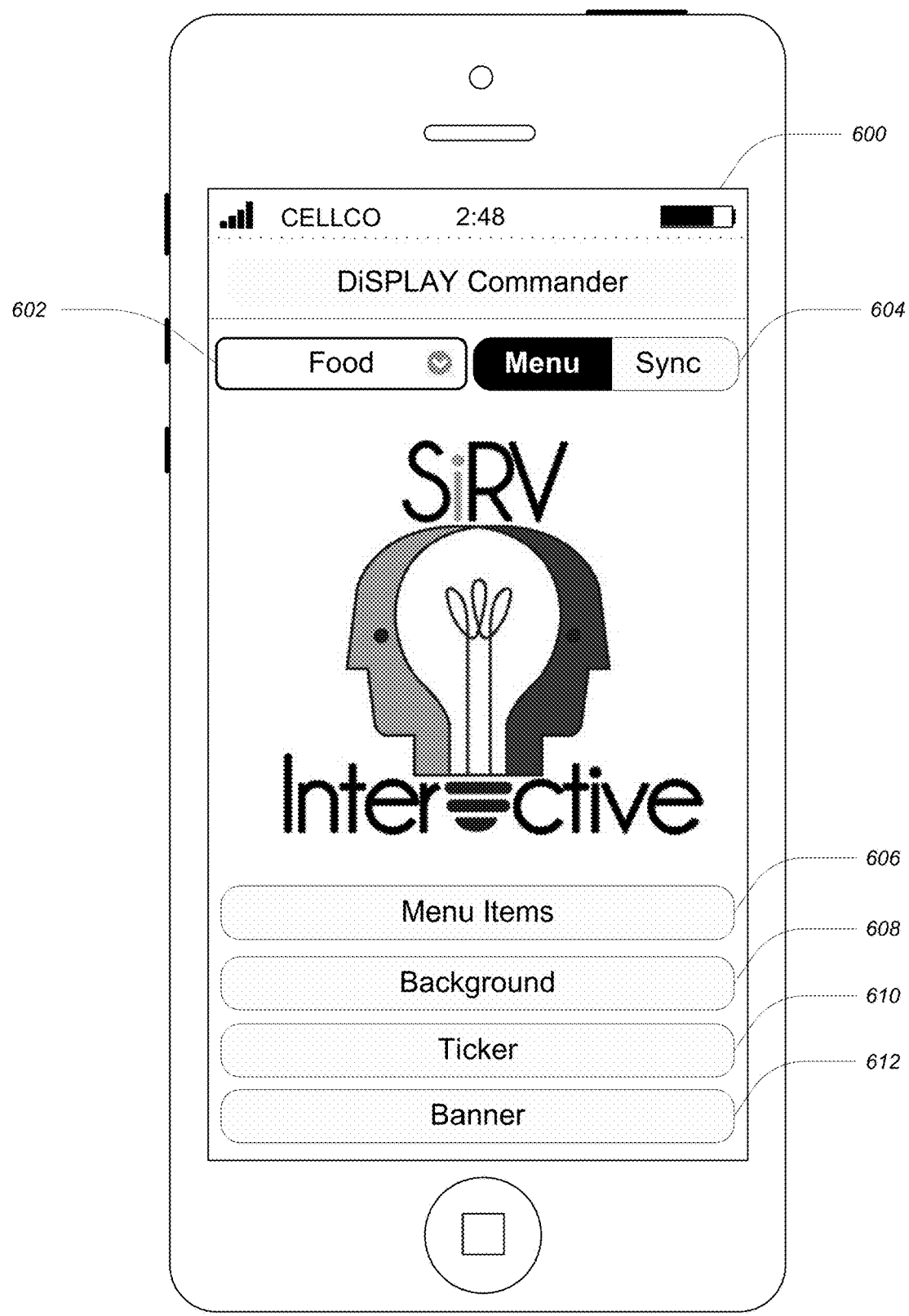
FIG. 6 is an example menu display configuration user interface presenting a main menu of configuration options to enable a user, such as an owner or operator of a retail establishment, to customize food menu content and related display settings, as used in an embodiment.

FIG. 6 is an example menu display configuration UI 600 presenting a main menu of configuration options to enable a user, such as an owner or operator of a retail establishment, to customize food menu content and related display settings. The menu display configuration UI 600 includes a user-selectable option 602 to view configuration options for one or more displays or display types such as food, drink, and notices. In response to selection of one of the display options, the interactive menu display system 100 may generate or provide a different user interface for the respective selected display option. For example, selection of a "drinks" option may cause presentation of the menu display configuration UI 1100 illustrated and described with reference to FIG. 11 herein, whereas selection of a "notice" option may cause presentation of the menu display configuration UI 1200 illustrated and described with reference to FIG. 12 herein. The menu display configuration UI 600 may also include a user-selectable option 604 to toggle the view between the main menu configuration options as illustrated and a synchronization menu (not illustrated) by which the user can manually initiate synchronization of menu content and related display settings with one or more menu displays.

FIG. 6 provides several main menu options which the user may use to manage food menu content and display settings. Selection of these main menu options will cause presentation of respective configuration UIs. For example, a menu items option 606 may be provided, and upon selection by the user a menu item configuration user interface, such as the UI 700 of FIG. 7, may be presented. Additionally, a background option 608 may be provided, and upon selection by the user a background configuration user interface, such as the UI 1300 of FIG. 13, may be presented; a ticker option 610 may be provided, and upon selection by the user a ticker configuration user interface, such as the UI 1400 of FIG. 14, may be presented; and/or a banner option 612 may be provided, and upon selection by the user a banner configuration user interface, such as the UI 1700 of FIG. 17, may be presented.

Figure 7:
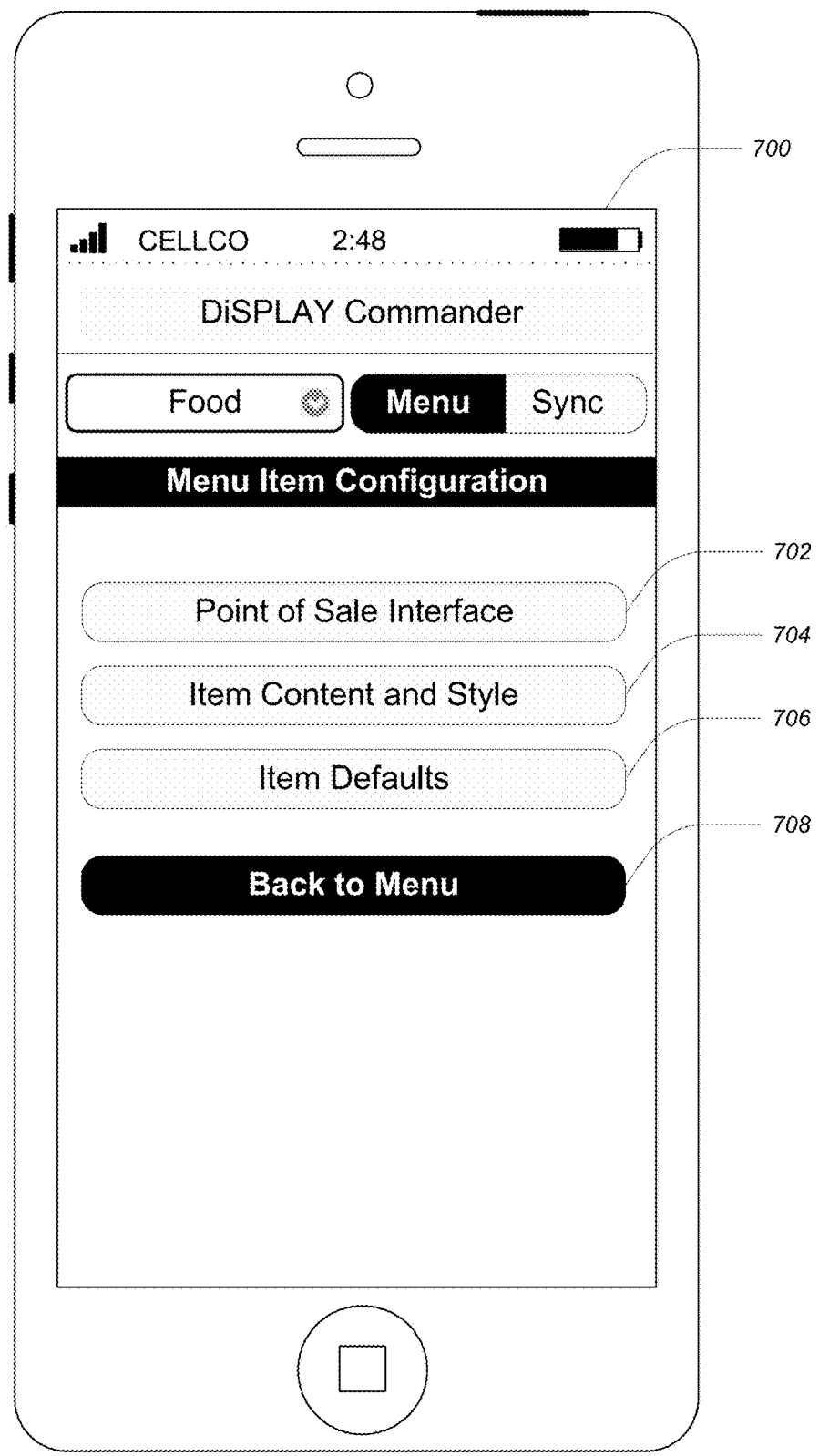
FIG. 7 is an example menu display configuration user interface presenting a menu of configuration options to enable a user, such as an owner or operator of a retail establishment, to customize menu item content and related display settings, as used in an embodiment.

FIG. 7 is an example menu display configuration UI 700 presenting a menu of configuration options to enable a user, such as an owner or operator of a retail establishment, to customize menu item content and related display settings. FIG. 7 provides several menu options which the user may use to configure menu item content and display settings. Selection of these main menu options will cause presentation of respective configuration UIs. For example, a point of sale interface option 702 may be provided, and upon selection by the user a point of sale configuration user interface, such as the UI 1000 of FIG. 10, may be presented; an item content and style option 704 may be provided, and upon selection by the user an item content and style user interface, such as the UI 800 of FIG. 8, may be presented; and/or an item defaults 706 may be provided, and upon selection by the user an item default configuration user interface, such as the UI 900 of FIG. 9, may be presented.

Figure 8:
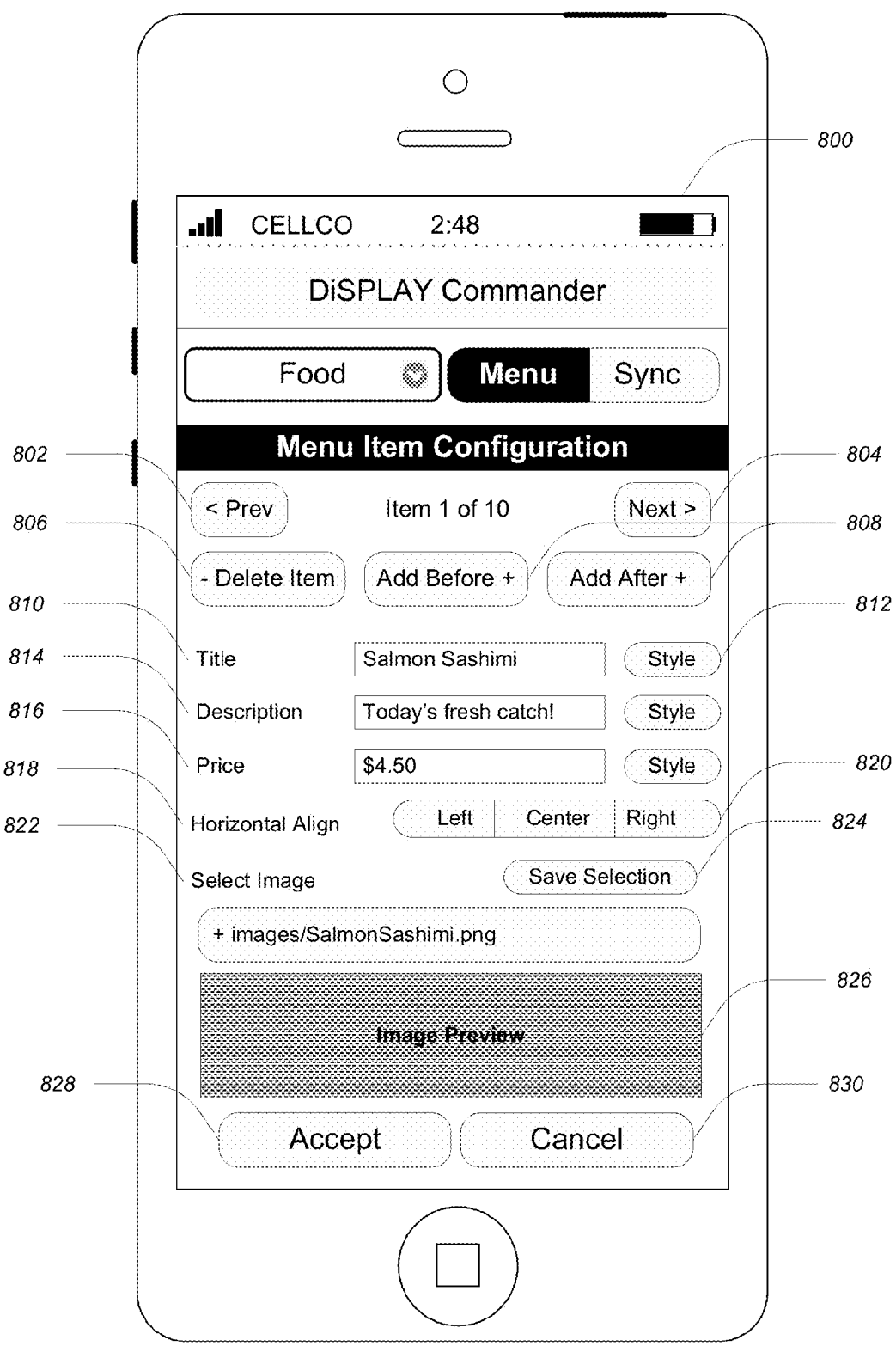
FIG. 8 is an example item content and style user interface presenting various configuration options to enable a user, such as an owner or operator of a retail establishment, to edit and customize menu item content and related display settings, as used in an embodiment.

FIG. 8 is an example item content and style UI 800 presenting various configuration options to enable a user, such as an owner or operator of a retail establishment, to edit and customize menu item content and related display settings. Menu item configuration options may include, for example, view navigation options such as a previous button 802 and a next button 804 to enable the user to quickly and easily navigate through multiple menu items. Menu item configuration options may also include item creation and deletion options such as delete item button 806 and add before and/or add after button(s) 808 to enable the user to quickly add and remove items from the menu. For a particular menu item, menu item configuration options may include a title input element 810, a description input element 812, a price input element 816, a horizontal alignment setting 818 with a left/center/right option 820, and an image select option 822 which may include an associated dropdown list or menu of images available for selection. The dropdown list or menu of images available for selection may be generated, for example, based on a library or repository of images available for use with the display menu, which may be stored and/or accessed from the menu and content data store 170. The item content and style configuration UI 800 may also present an image preview 826 which may be configured to update dynamically in response to the user's selection of an image associated with the image select option 822. The item content and style configuration UI 800 may also present, for one or more input elements (such as the title input element 810, the description input element 814, and the price input element 816), an associated style option 812 which may, upon selection by the user, cause a popover style configuration user interface to be presented to enable the user to select one or more style options. The popover style configuration user interface may be similar to the example style configuration UI illustrated and described with reference to FIG. 16 herein.

When the user has finished providing item and content configuration settings for the menu item configuration options, the user may choose to Accept 828 the changes or Cancel 830 the changes. In response to the user accepting the changes, the user computing device may provide the item and content configuration settings to the interactive menu display system 100, which may in turn re-generate or update any of the menu display UIs which may be affected by any updates. In response to the user cancelling the changes, the user may be returned to another menu configuration UI, depending on the embodiment.

Figure 9:
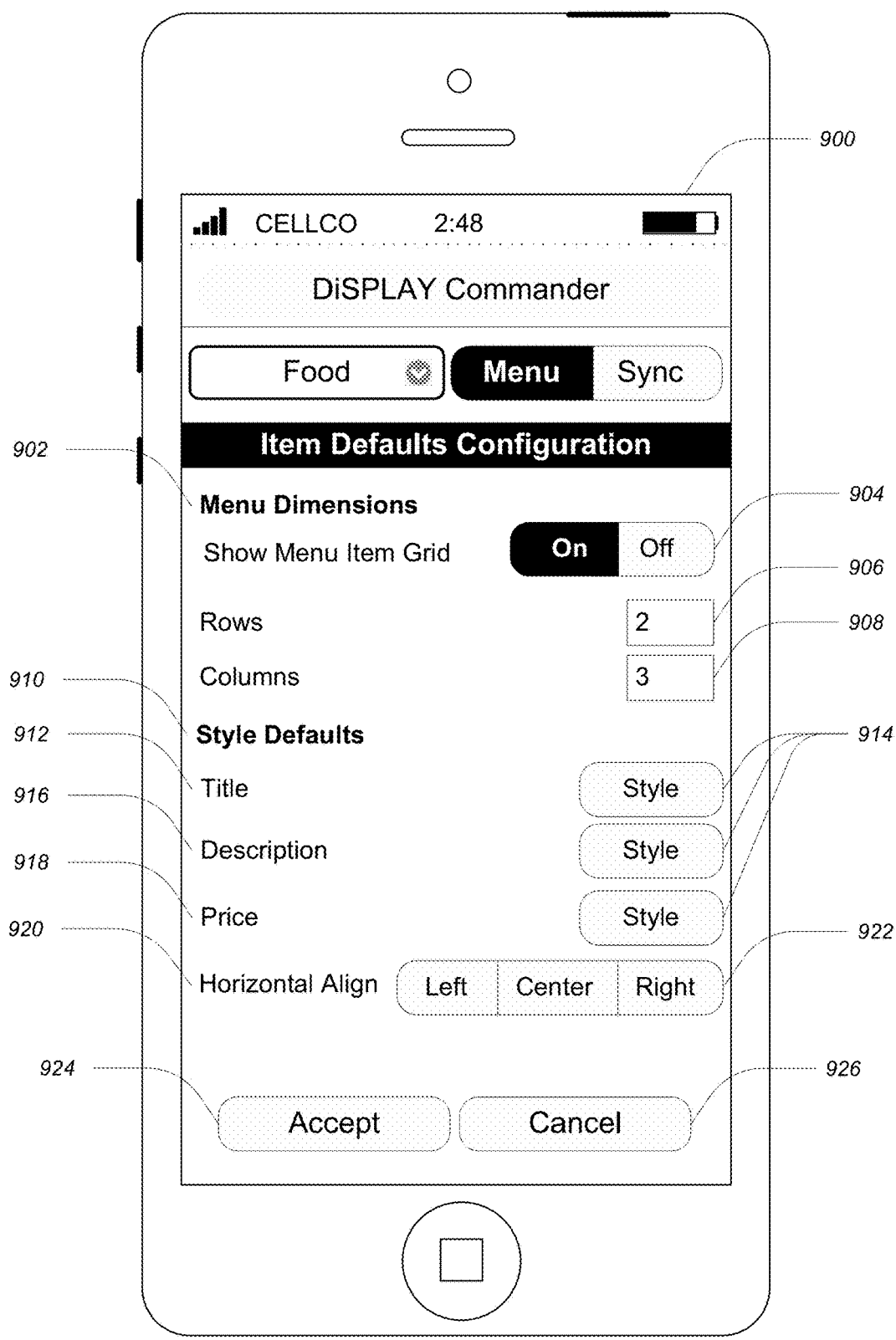
FIG. 9 is an example item default style settings user interface presenting various configuration options to enable a user, such as an owner or operator of a retail establishment, to edit and customize menu item default display settings, as used in an embodiment.

FIG. 9 is an example item default style settings user interface 900 presenting various configuration options to enable a user, such as an owner or operator of a retail establishment, to edit and customize menu item default display settings. Item default style options may include, for example, options to configure default menu dimensions, including an option to specify whether a menu item grid 904 should be shown in the menu display, an option to specify a default number of rows 906, and an option to specify a default number of columns 908. Additional item default style options 910 may include, for example, for each of title 912, description 916, and price 918 associated style options 914. The associated style options 914 may, upon selection by the user, cause a popover style configuration user interface to be presented to enable the user to select one or more style options. The popover style configuration user interface may be similar to the example style configuration UI illustrated and described with reference to FIG. 16 herein. Further item default style options 910 may include, a horizontal alignment setting 920 with a left/center/right option 922 to indicate a default alignment for menu items within respective portions of a menu display UI.

When the user has finished providing item default configuration settings for the item default configuration options, the user may choose to Accept 924 the changes or Cancel 926 the changes. In response to the user accepting the changes, the user computing device may provide the item default 14 configuration settings to the interactive menu display system 100, which may in turn re-generate or update any of the menu display UIs which may be affected by any updates. In response to the user cancelling the changes, the user may be returned to another menu configuration UI, depending on the embodiment.

Figure 10:
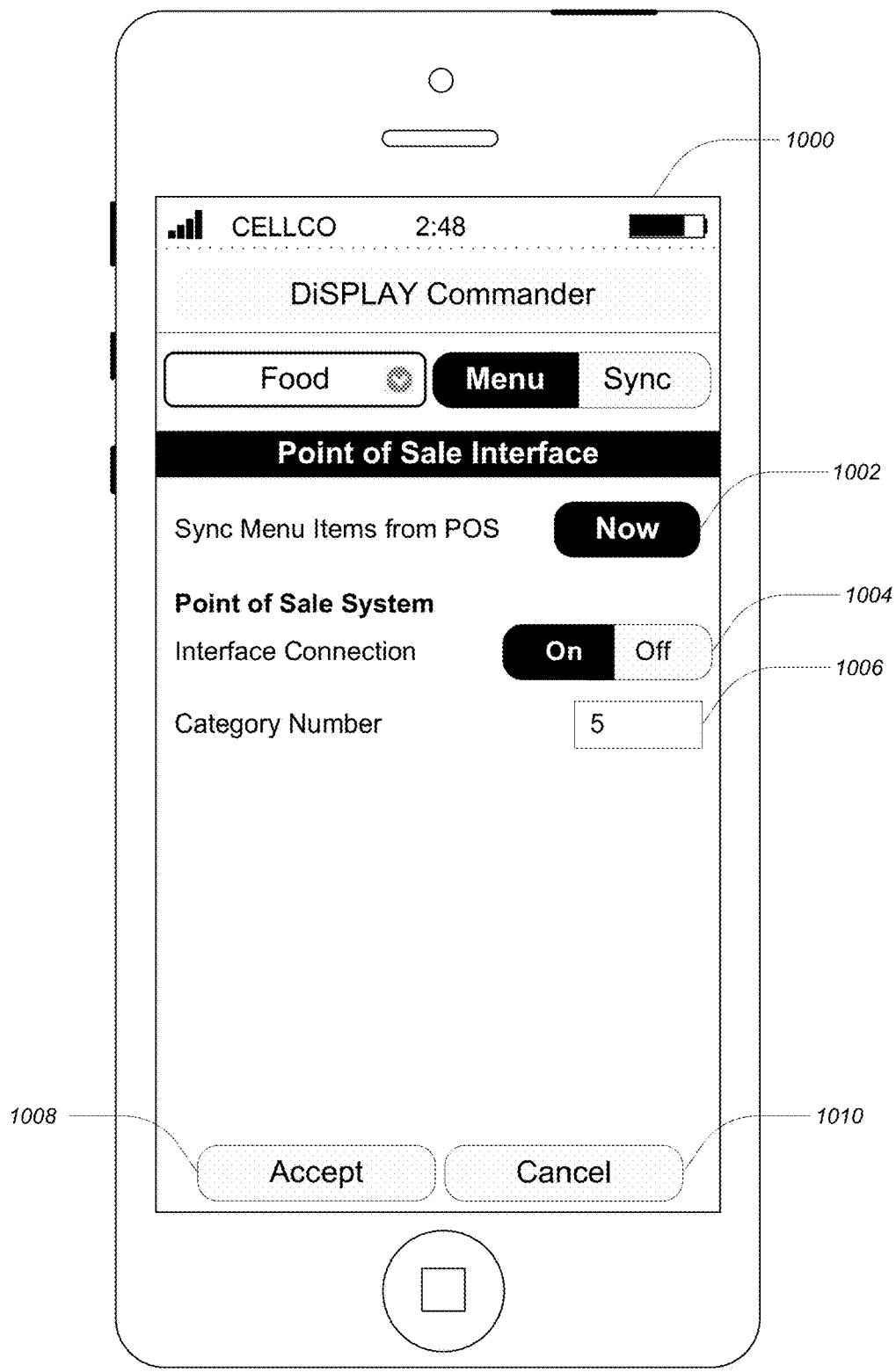
FIG. 10 is an example point of sale configuration user interface presenting various configuration options to enable a user, such as an owner or operator of a retail establishment, to manage interfacing with a point of sale ("POS") system, as used in an embodiment.

FIG. 10 is an example point of sale configuration user interface 1000 presenting various configuration options to enable a user, such as an owner or operator of a retail establishment, to manage interfacing with a point of sale ("POS") system. The POS system may be installed at the retail establishment, and may be a separate system from the interactive menu display system. Interfacing between the POS system and the interactive menu display system may provide several benefits, including the ability to synchronize menu and content data for menus associated with the retail establishment with data from the POS system, which may include for example menu data related to items for sale at the retail establishment.

As shown in FIG. 10, point of sale options may include, for example, an option 1002 to sync menu items from a POS system. This feature may be beneficial because the owner or manager of the retail establishment may have existing menu content data stored in conjunction with a POS system, which may be used to initialize or update corresponding data for the retail establishment stored in the menu and content data store 170. This would reduce or eliminate the need to manually re-enter data for the same menu items. In another embodiment another option may be provided to enable synchronization of menu items from the interactive menu display system 100 to the POS system. Depending on the embodiment the retail establishment may wish to keep one or the other of these systems as a primary data source, with the other being a secondary data source, and then periodically sync menu items from the primary data source to the secondary data source. Additional point of sale options may include an option to specify whether an interface connection 1004 to the POS system is "On" or "Off" and to specify a category number 1006 associated with the POS system.

When the user has finished providing point of sale interface configuration settings for the point of sale options, the user may choose to Accept 1008 the changes or Cancel 1010 the changes. In response to the user accepting the changes, the user computing device may provide the point of sale interface configuration settings to the interactive menu display system 100, which may in turn re-generate or update any of the menu display UIs which may be affected by any updates. In response to the user cancelling the changes, the user may be returned to another menu configuration UI, depending on the embodiment.

Figure 11:
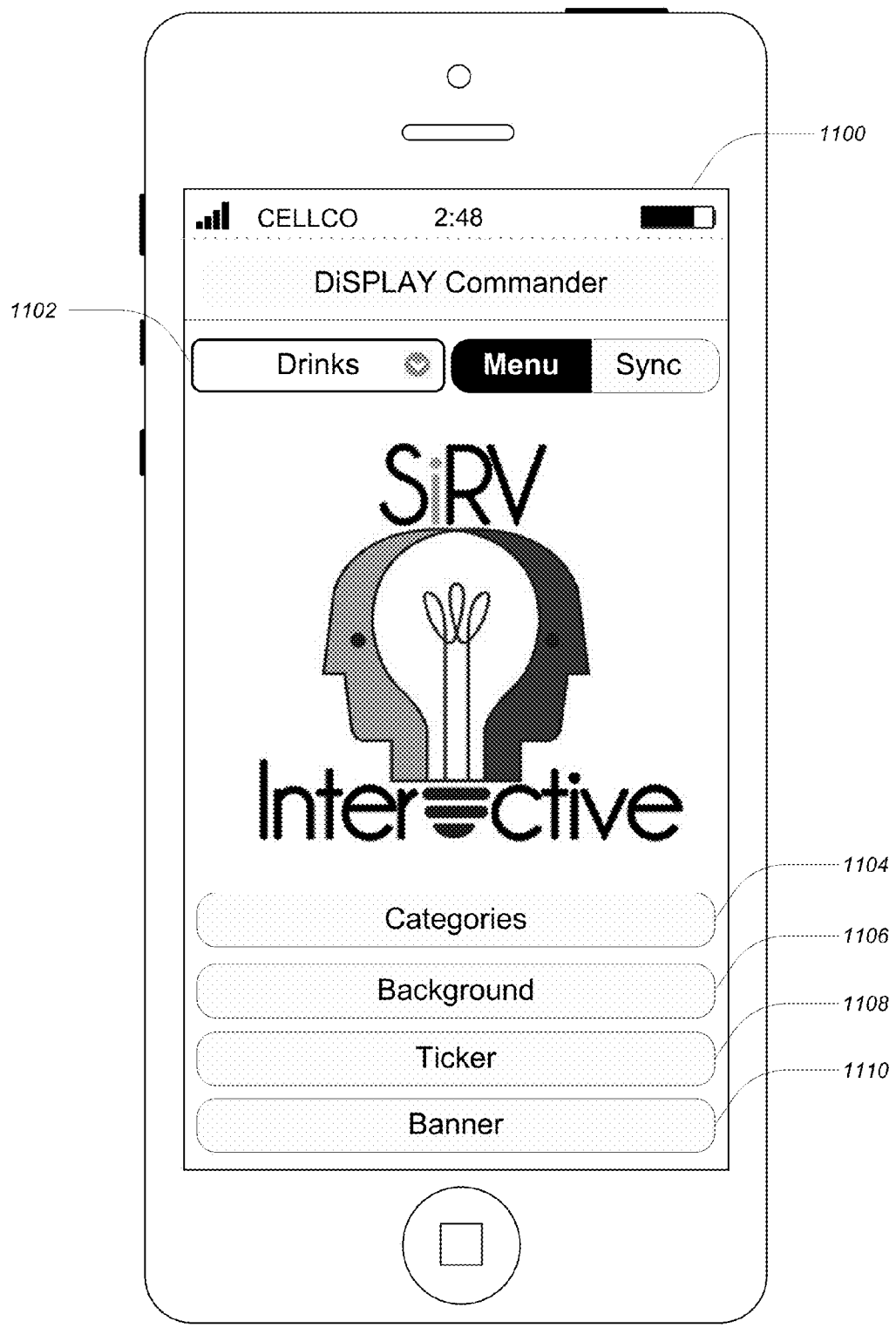
FIG. 11 is an example menu display configuration user interface presenting a main menu of configuration options to enable a user, such as an owner or operator of a retail establishment, to customize drink menu content and related display settings, as used in an embodiment.

FIG. 11 is an example menu display configuration UI 1100 presenting a main menu of configuration options to enable a user, such as an owner or operator of a retail establishment, to customize drink menu content and related display settings. Similar to the menu display UI 600 of FIG. 6, the menu display configuration UI 1100 includes a user-selectable option 1102 to view configuration options for one or more displays or display types such as food, drink, and notices. In response to selection of one of the display options, the interactive menu display system 100 may generate or provide a different user interface for the respective selected display option.

FIG. 11 provides several main menu options which the user may use to manage drink menu content and display settings. Selection of these main menu options will cause presentation of respective configuration UIs. For example, a categories option 1104 may be provided, and upon selection by the user a menu item configuration user interface, similar to the UI 700 of FIG. 7, may be presented. Additionally, a background option 1106 may be provided, and upon selection by the user a background configuration user interface, such as the UI 1300 of FIG. 13, may be presented; a ticker option 1108 may be provided, and upon selection by the user a ticker configuration user interface, such as the UI 1400 of FIG. 14, may be presented; and/or a banner option 1110 may be provided, and upon selection by the user a banner configuration user interface, such as the UI 1700 of FIG. 17, may be presented.

Figure 12:
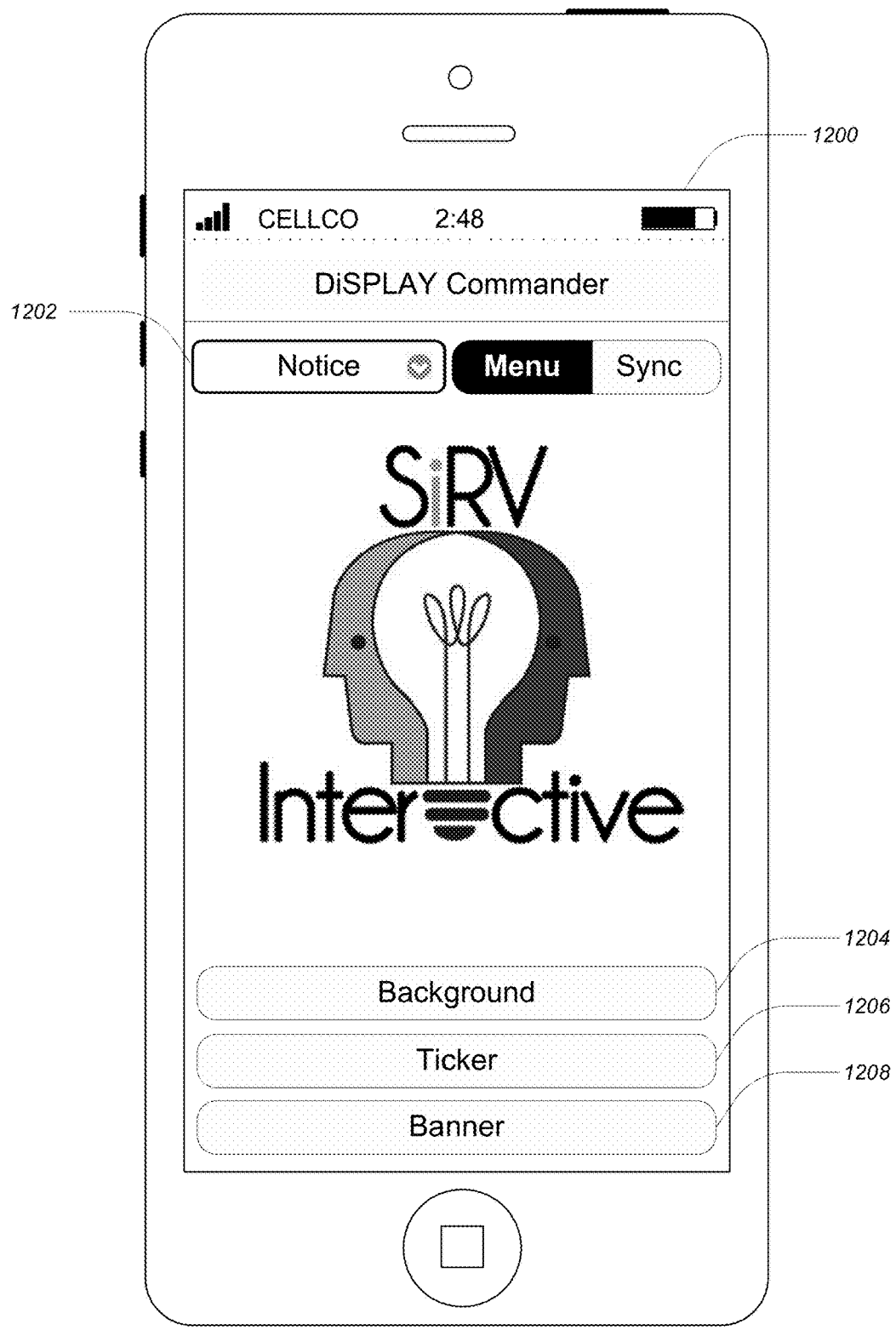
FIG. 12 is an example menu display configuration user interface presenting a main menu of configuration options to enable a user, such as an owner or operator of a retail establishment, to customize notice menu content and related display settings, as used in an embodiment.

FIG. 12 is an example menu display configuration UI 1200 presenting a main menu of configuration options to enable a user, such as an owner or operator of a retail establishment, to customize notice menu content and related display settings. Similar to the menu display UI 600 of FIG. 6, the menu display configuration UI 1200 includes a user-selectable option 1202 to view configuration options for one or more displays or display types such as food, drink, and notices. In response to selection of one of the display options, the interactive menu display system 100 may generate or provide a different user interface for the respective selected display option.

FIG. 12 provides several main menu options which the user may use to manage notice menu content and display settings. Selection of these main menu options will cause presentation of respective configuration UIs. For example, a background option 1204 may be provided, and upon selection by the user a background configuration user interface, such as the UI 1300 of FIG. 13, may be presented; a ticker option 1206 may be provided, and upon selection by the user a ticker configuration user interface, such as the UI 1400 of FIG. 14, may be presented; and/or a banner option 1208 may be provided, and upon selection by the user a banner configuration user interface, such as the UI 1700 of FIG. 17, may be presented.

Figure 13:
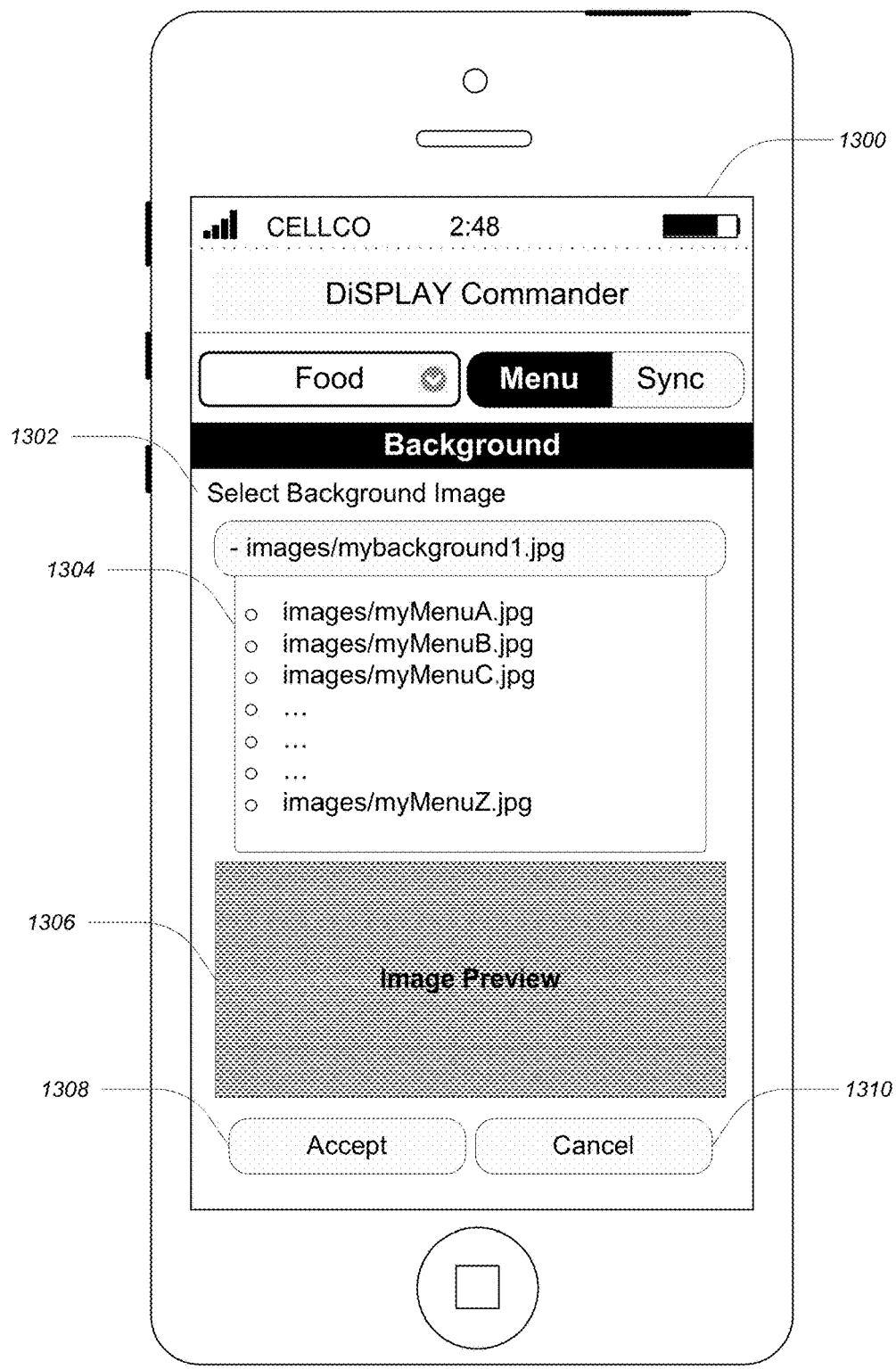
FIG. 13 is an example background configuration user interface presenting configuration options to enable a user, such as an owner or operator of a retail establishment, to customize a background image for a menu display, as used in an embodiment.

FIG. 13 is an example background configuration UI 1300 presenting configuration options to enable a user, such as an owner or operator of a retail establishment, to customize a background image for a menu display. Background options may include, for example, an option to select a background image 1302, which may further include display of a list of background images 1304 available for selection. The background configuration UI 1300 may also present an image preview 1306 which may be configured to update dynamically in response to the user's selection of an image from the list of background images 1304.

When the user has finished providing background configuration settings for the background options, the user may choose to Accept 1308 the changes or Cancel 1310 the changes. In response to the user accepting the changes, the user computing device may provide the background configuration settings to the interactive menu display system 100, which may in turn re-generate or update any of the menu display UIs which may be affected by any updates. In response to the user cancelling the changes, the user may be returned to another menu configuration UI, depending on the embodiment.

Figure 14:
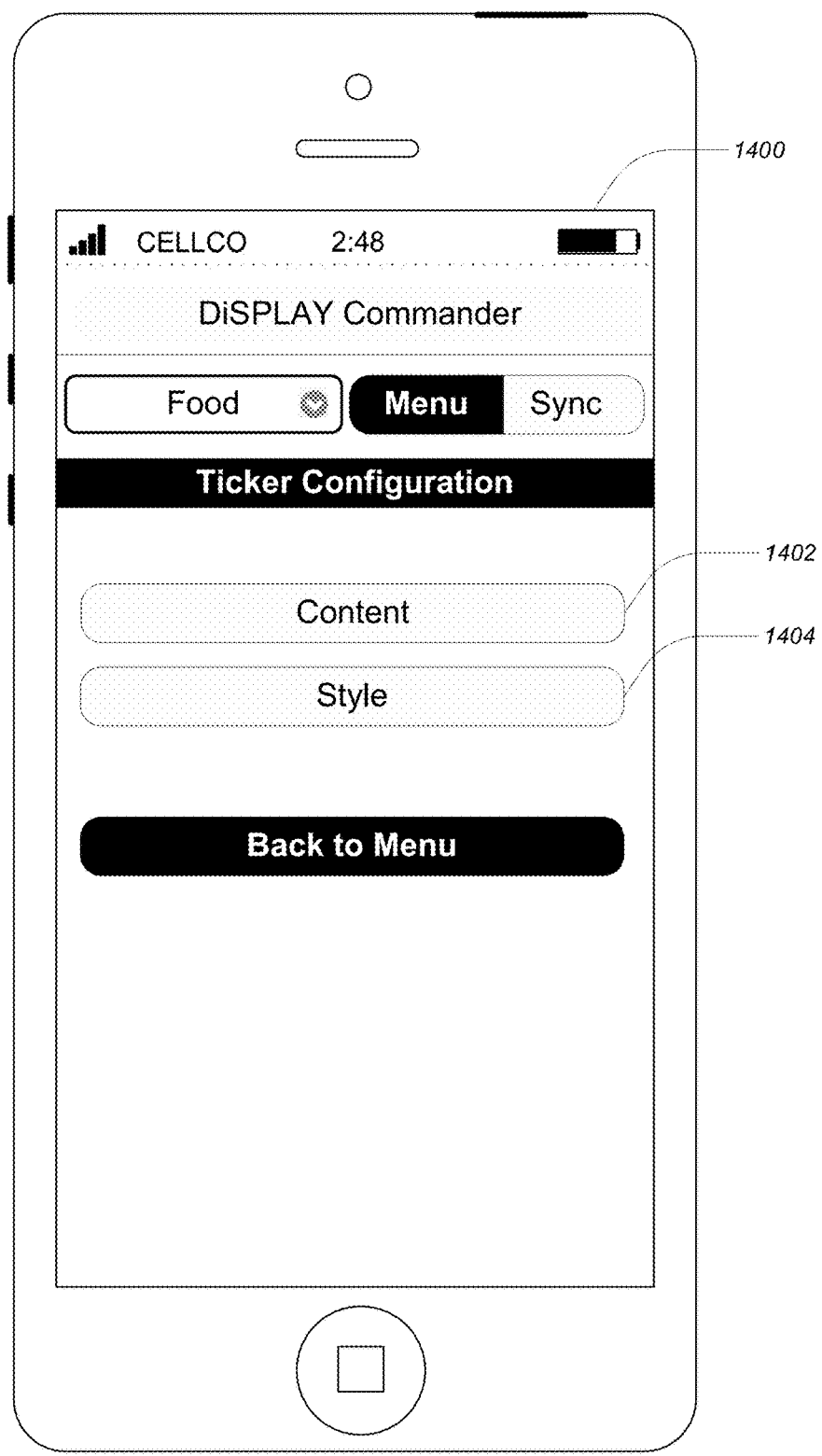
FIG. 14 is an example menu display configuration user interface presenting a menu of configuration options to enable a user, such as an owner or operator of a retail establishment, to customize ticker content and display style settings, as used in an embodiment.

FIG. 14 is an example menu display configuration UI 1500 presenting a menu of configuration options to enable a user, such as an owner or operator of a retail establishment, to customize ticker content and display style settings. FIG. 14 provides several menu options which the user may use to configure ticker content and display style settings. Selection of these menu options will cause presentation of respective configuration UIs. For example, a ticker content option 1402 may be provided, and upon selection by the user a point of sale configuration user interface, such as the UI 1500 of FIG. 15, may be presented; and/or a style option 1404 may be provided, and upon selection by the user an item content and style user interface, such as the UI 1600 of FIG. 16, may be presented.

Figure 15:
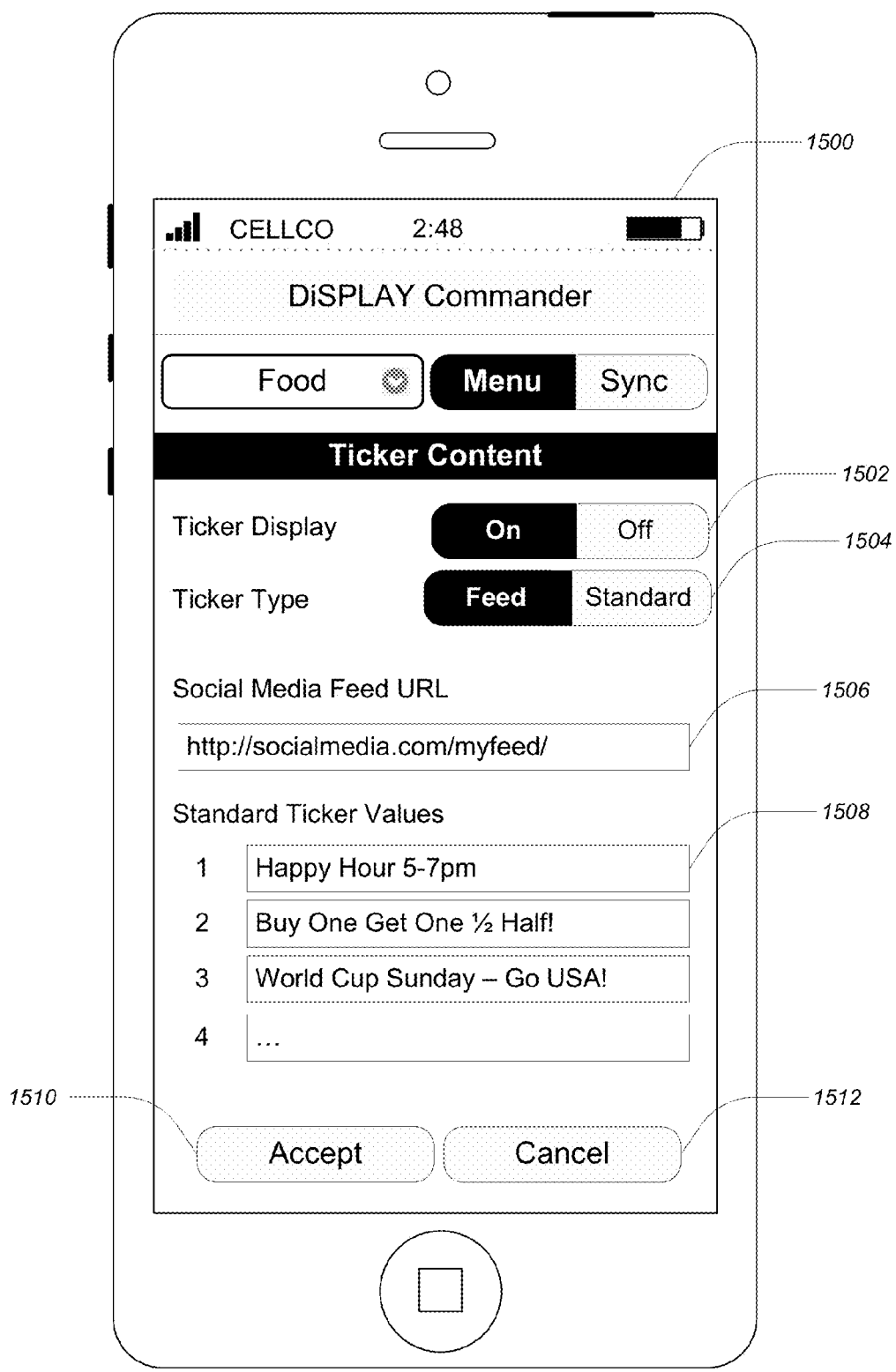
FIG. 15 is an example ticker configuration user interface presenting configuration options to enable a user, such as an owner or operator of a retail establishment, to customize ticker content for a menu display, as used in an embodiment.

FIG. 15 is an example ticker configuration UI 1500 presenting configuration options to enable a user, such as an owner or operator of a retail establishment, to customize ticker content for a menu display. Ticker content options may include, for example, a ticker display option 1502 which the user may set to "On" or "Off" to enable or disable display of the ticker in a corresponding menu display UI. Another ticker option may include a ticker type option 1504 to enable the user to choose between using a content feed, which the user can provide using a social media feed URL option 1506, or using one or more standard ticker values, which the user can provide using one or more standard ticker values 1508.

When the user has finished providing ticker content configuration settings for the ticker options, the user may choose to Accept 1510 the changes or Cancel 1512 the changes. In response to the user accepting the changes, the user computing device may provide the ticker configuration settings to the interactive menu display system 100, which may in turn re-generate or update any of the menu display UIs which may be affected by any updates. In response to the user cancelling the changes, the user may be returned to another menu configuration UI, depending on the embodiment.

Figure 16:
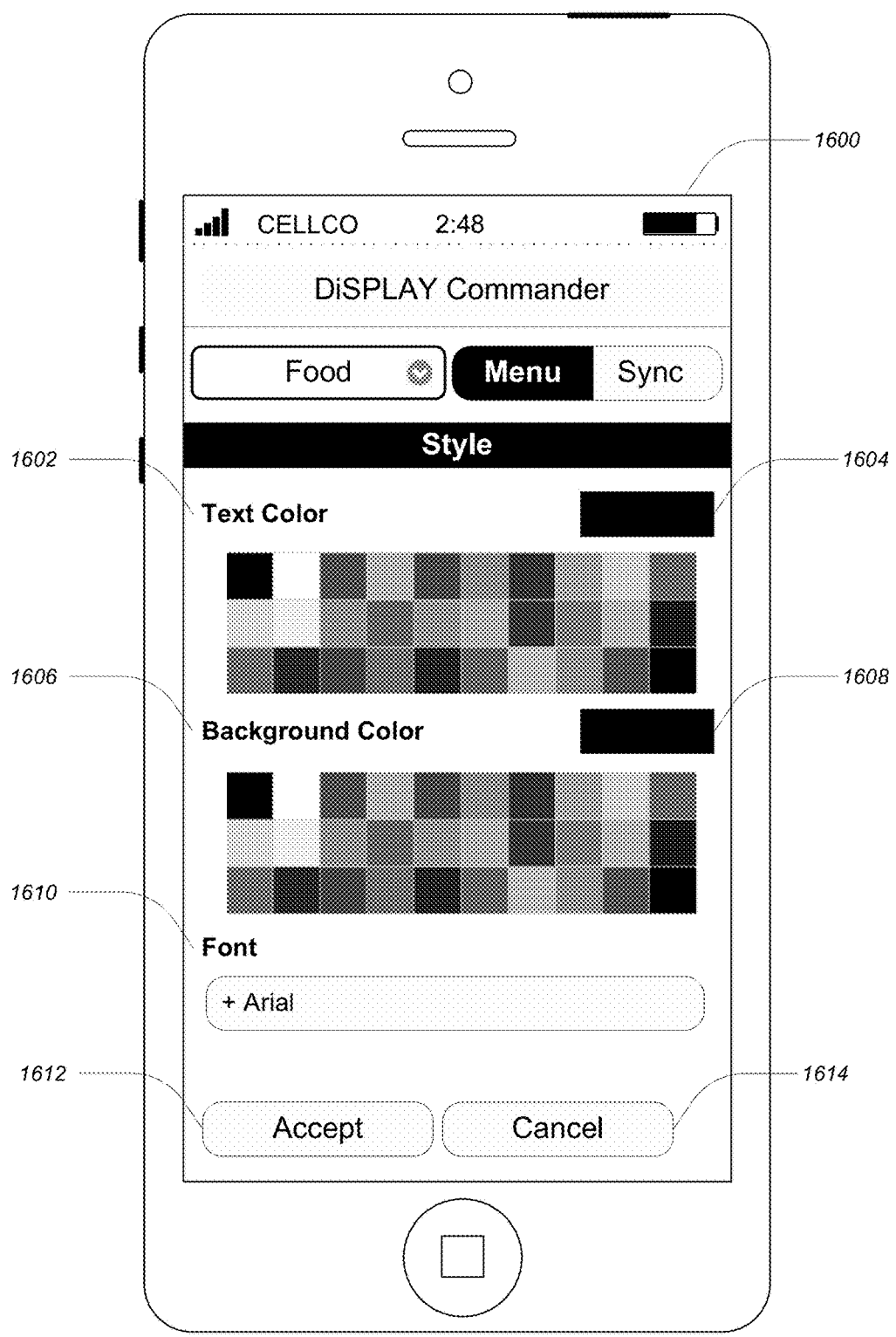
FIG. 16 is an example style configuration user interface presenting configuration options to enable a user, such as an owner or operator of a retail establishment, to customize style settings for a menu display, as used in an embodiment.

FIG. 16 is an example style configuration UI 1600 presenting configuration options to enable a user, such as an owner or operator of a retail establishment, to customize style settings for a menu display. The style configuration UI 1600 may be provided in a variety of contexts, including but not limited to: enabling configuration of style settings for a ticker, enabling configuration of style settings for menu items, enabling configuration of style settings for drink items, and so on. Style options may include, for example, a text color 1602, a background color 1606, and a font 1610.

Additional style options not shown may include a font size, font styles such as bold, italics, and underline, alignment settings, and the like. The style configuration UI 1600 may also provide an indicator of the currently selected text color 1604 and/or an indicator of the currently selected background color 1608.

When the user has finished providing style configuration settings for the style options, the user may choose to Accept 1612 the changes or Cancel 1614 the changes. In response to the user accepting the changes, the user computing device may provide the style configuration settings to the interactive menu display system 100, which may in turn re-generate or update any of the menu display UIs which may be affected by any updates. In response to the user cancelling the changes, the user may be returned to another menu configuration UI, depending on the embodiment.

Figure 17:
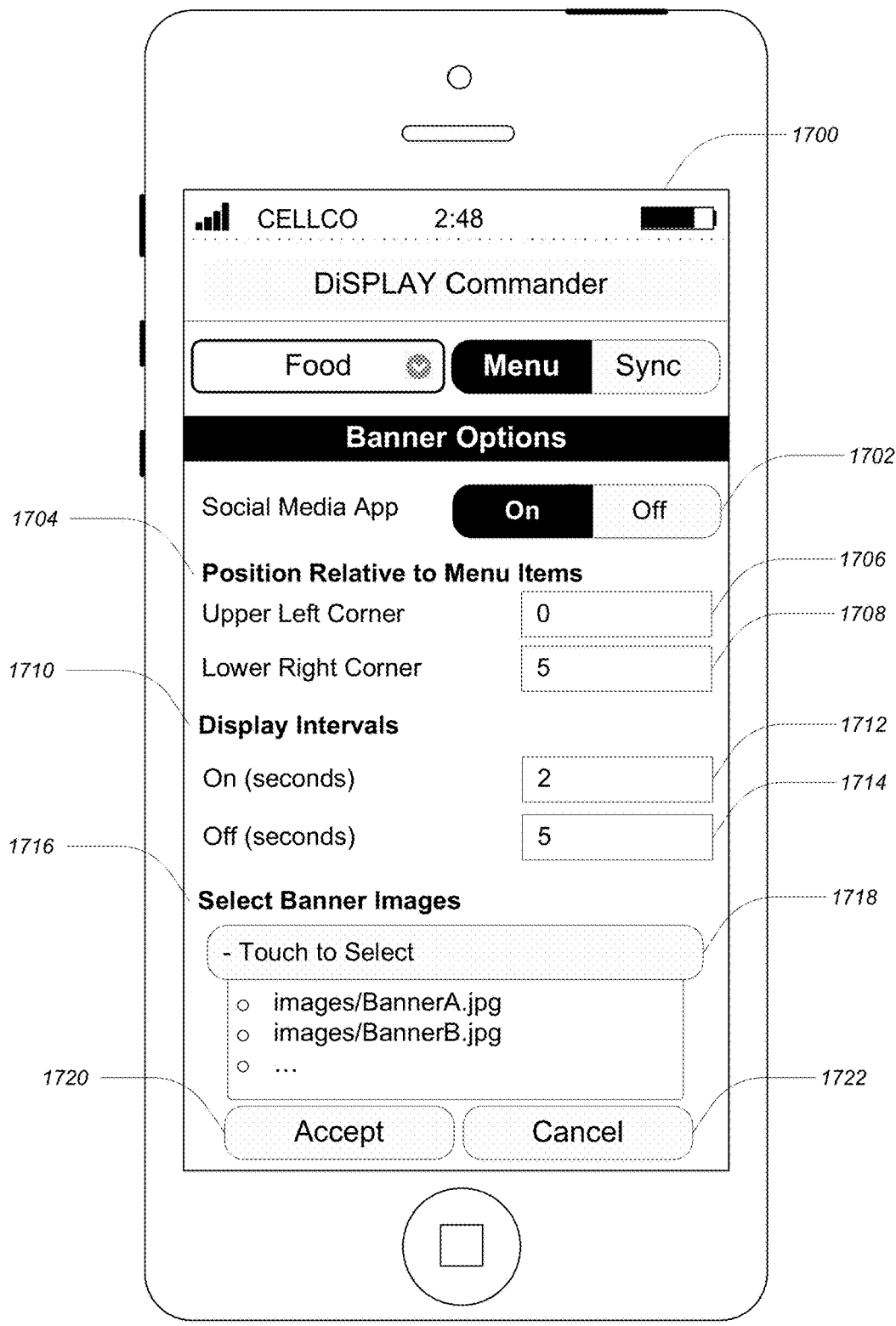
FIG. 17 is an example banner configuration user interface presenting configuration options to enable a user, such as an owner or operator of a retail establishment, to customize banner content and style for a menu display, as used in an embodiment.

FIG. 17 is an example banner configuration UI 1700 presenting configuration options to enable a user, such as an owner or operator of a retail establishment, to customize banner content and style for a menu display. Banner options may include, for example, a social media app option 1702 which the user may set to "On" or "Off" to enable or disable content from a social media application, social network, or other social media website. For example, the social media content may be accessed from a social media data feed, such as a Facebook feed, a Twitter feed, an Instagram feed, and so on. Additional banner options may include options to configure a position of the banner relative to menu items 1704, including an option to specify an upper left corner 1706 and a lower right corner 1708 to define the corner edge boundaries of the banner. Further banner options may include options to configure display intervals 1710 for timed presentation of the banner, including an option to specify an on time period 1712 and an off time period 1714. The banner configuration UI 1700 may also provide an option to select one or more banner images 1716, which may be presented as a dropdown menu 1718 listing one or more banner images available for display. The listing of one or more banner images may be accessed, for example, from the menu and content data store 170.

In another embodiment, the banner configuration UI 1700 may also provide an option to add or create a new banner image. The user may want to utilize this feature to, for example, create a custom banner image from a photograph of a menu item (e.g., food or drink) available at the retail establishment, or of a performer who performs at the retail establishment, and so on. For example, the user may be provided with options to choose an existing photo (e.g., from a photo library that may be stored locally on the user's computing device), or to take anew photo (e.g., using a camera or video capture device on the user's computing device). Once a photo is selected, the user may be presented with one or more photo editing options including options to crop the photo, apply photo filters (e.g., such as a filter optimized or designed to improve the appearance or presentation of food items in photographs), and/or apply other image processing to the photo (e.g., color manipulation, image/photo rotation, resizing and/or zooming, image lighting effects, etc.). The user interface may also provide the user with an option to add text to be displayed with the photo, such as a title and/or a price. The user interface may also present options for the user to edit styles associated with the text (e.g., font size, text color, font style, etc.) via a similar style setting UI as described in the present disclosure. Once the user has finished uploading the photo and selecting text, font, and style settings, the user may name the banner and be able to save the banner for use throughout the menu display. For example, the newly created banner may be saved to the menu and content data store 170 and accessed for use later in managing banner display settings via the banner configuration UI 1700. In another embodiment, the banner configuration UI 1700 may also provide an option for the user to apply any of the one or more photo editing options described above (e.g., crop the photo, apply photo filters, and/or apply other image processing to the photo) to an image selected for the banner (e.g., to an image that is already previously uploaded and/or available for use in the menu display, such as an image stored in the menu and content data store 170). This way the user can customize banner images in the image repository before or at the time of upload, or after uploading, depending on the circumstances. For example, the user may wish to re-use a certain image multiple times to create various different types of custom banners, such as with different types of filters applied and/or with different custom text (e.g., different prices for different times of day, for special offers or events, and so on).

When the user has finished providing banner configuration settings for the banner options, the user may choose to Accept 1720 the changes or Cancel 1722 the changes. In response to the user accepting the changes, the user computing device may provide the banner configuration settings to the interactive menu display system 100, which may in turn re-generate or update any of the menu display UIs which may be affected by any updates. In response to the user cancelling the changes, the user may be returned to another menu configuration UI, depending on the embodiment.

Figure 18:
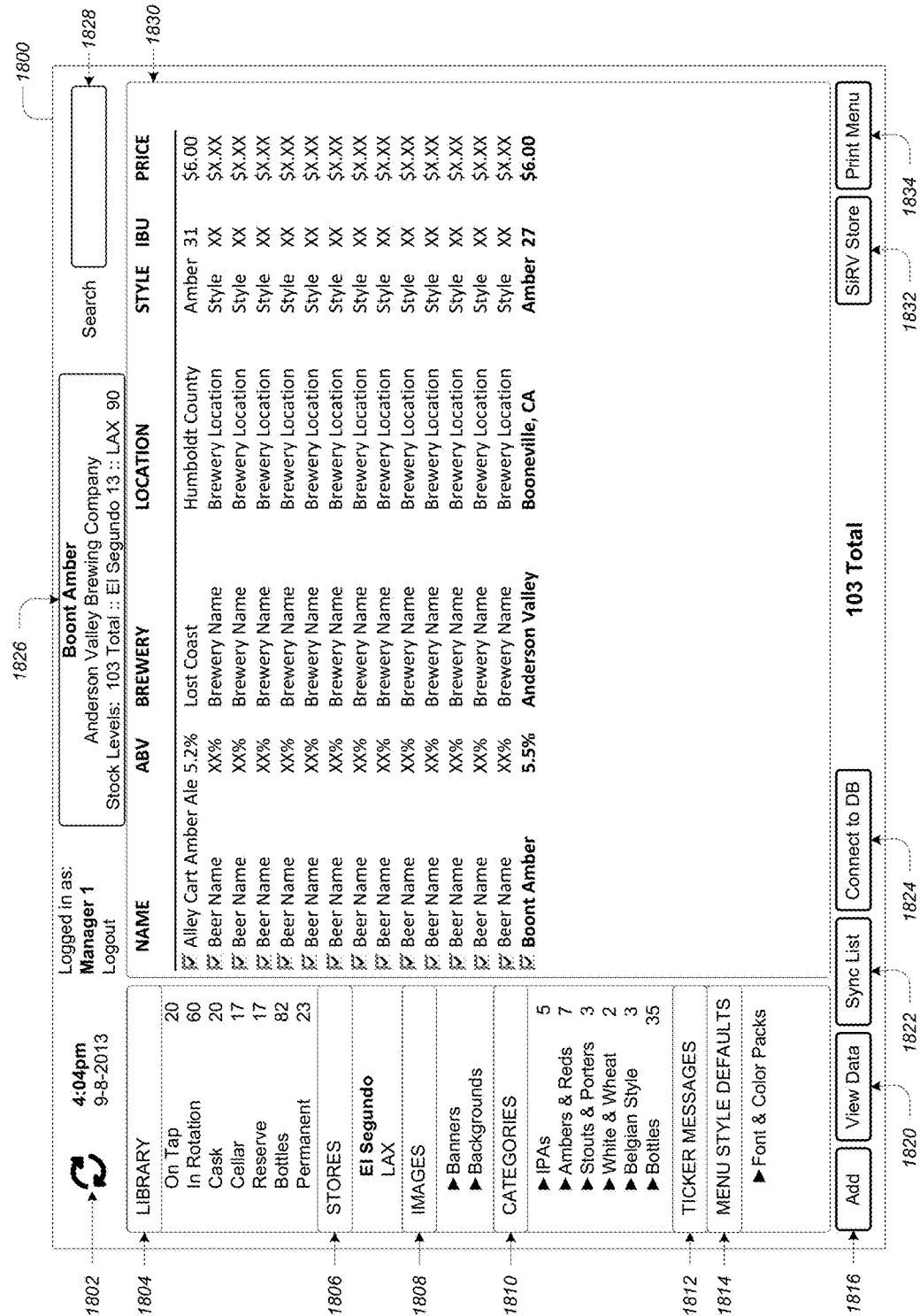
FIG. 18 is an example administrator portal user interface to enable a user, such as an owner or operator of a retail establishment, to manage one or more menu settings related to a menu display, as used in an embodiment.

FIG. 18 is an example administrator portal user interface ("UI") 1800 to enable a user, such as an owner or operator of a retail establishment, to manage one or more menu settings related to a menu display, as used in an embodiment. For example, the portal UI 1800 may be provided in an embodiment to enable the owner or manager to manage a menu from a more traditional desktop or standalone application such as a web browser. Among other user control elements, the portal UI 1800 may include a sync option 1802 to enable the owner/user to manually synchronize the current menu content and layout settings with any corresponding menu display user interfaces which may be presented, for example, on display devices 166. The example portal UI 1800 includes, via a menu on the left portion of the UI, a presentation of a drinks library submenu 1804, which lists several different types of drinks/beverages (e.g., on tap, in rotation, cask, cellar, reserve, bottles, permanent) and corresponding quantity amounts indicating an amount on-hand or available in the library. The portal UI 1800 also includes a presentation of a stores submenu 1806 listing stores available for management (e.g., as shown here, El Segundo and LAX). The portal UI 1800 also includes a presentation of an images submenu 1808 which lists two submenu options for the user to manage, for example, banners/banner images and backgrounds, which may be stored in the menu and content data store 170.

The example portal UI 1800 of FIG. 18 includes, a presentation of a categories submenu 1810, which lists several different categories of drinks/beverages (e.g., IPAs, Ambers & Reds, Stouts & Porters, White & Wheat, Belgian Style, and bottles), and corresponding quantity amounts indicating an amount on-hand or available in the library. The portal UI 1800 also includes a presentation of a ticker messages submenu 1812, which may be selected by the user to manage (e.g., add, edit, delete, etc.) ticker-related settings, such as those illustrated and described with reference to FIG. 15 herein. The portal UI 1800 also includes a presentation of a menu style defaults submenu 1814, which may be selected by the user to manage (e.g., add, edit, delete, etc.) style and/or item default settings, such as those illustrated and described with reference to FIGS. 9 and 16 herein.

The example portal UI 1800 of FIG. 18 also illustrates a number of options which may be available to the user, including an option to add 1816 a new item to the currently selected library or category item, such as to add a new drink to the currently selected and displayed list of drinks 1830. The portal UI 1800 also includes an option to view data 1820, which may cause presentation of additional data related to the currently displayed list 1830; an option to sync 1822 the currently displayed list 1830, for example to update any corresponding menu display user interfaces which may be presented, for example, on display devices 166; an option to connect to a database ("DB") 1824 to initiate a database connection; an option to access a SiRV store 1832, which may provide access to special or additional templates, apps, banners, and other content which may be used with the interactive menu display system 100; and/or an option to print a menu 1834, which may for example initiate printing of the menu according to the current menu library, content, style settings, and so forth.

Also shown in the sample portal UI 1800 of FIG. 18, a current item display 1826 may be provided to present detailed information about a particular item selected in the list 1830. Detailed information might include, for example, a name of a beverage, a name of the source (e.g., a brewery), and/or current stock/inventory levels either in total across all stores and/or on a per-store basis as shown. The portal UI 1800 may also present a search option 1828 to enable the user to search the entire menu and/or library, including any/all food items, drink items, notice items, banners/banner images, advertising, and any other related content that may be stored in association with the menu and/or the retail establishment.

Figure 19:
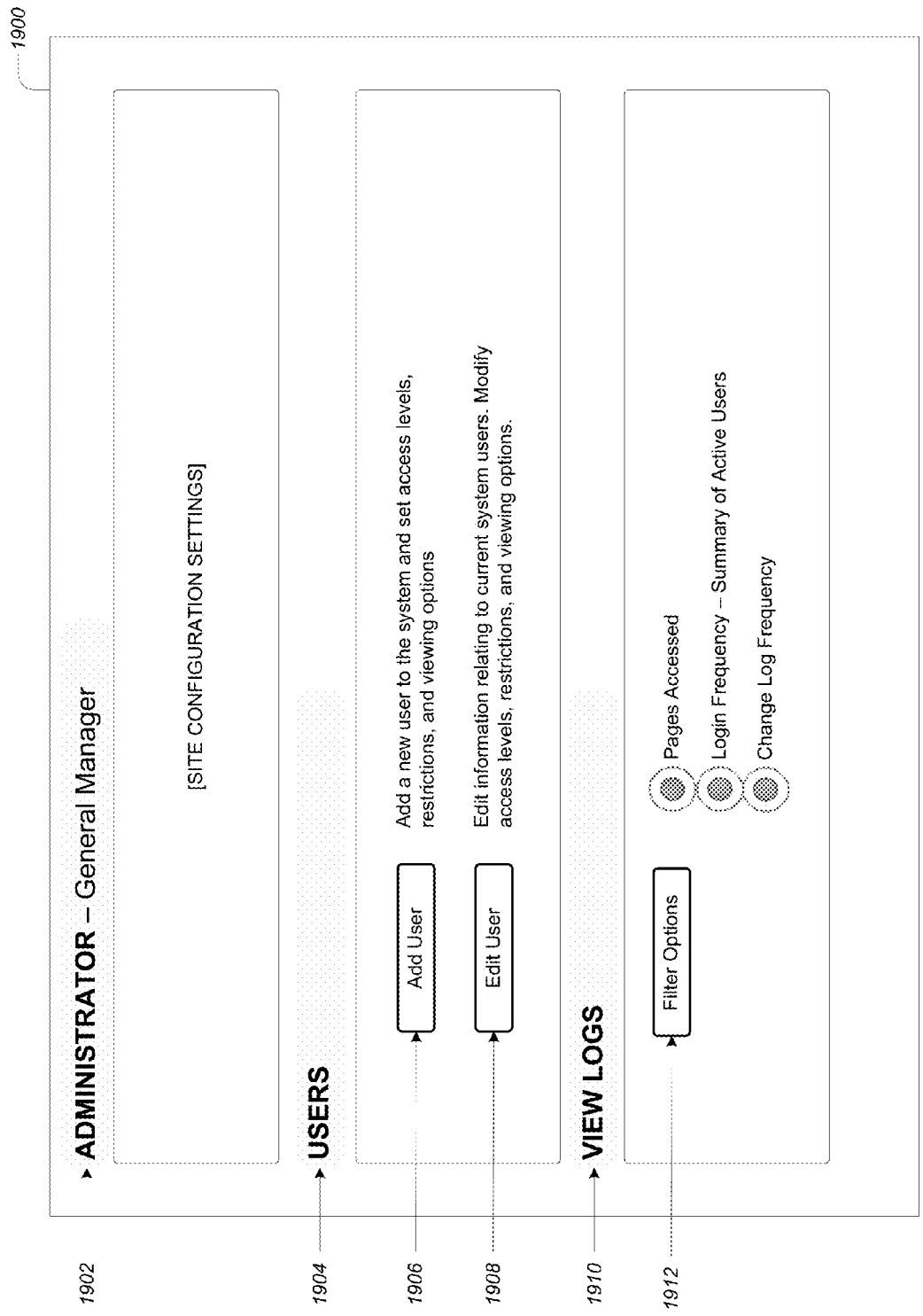
FIG. 19 is an example administrator portal user interface to enable a user, such as an owner or operator of a retail establishment, to manage user and system settings related to an interactive menu display system, as used in an embodiment.

FIG. 19 is an example administrator portal user interface ("UI") 1900 to enable a user, such as an owner or operator of a retail establishment, to manage user and system settings related to an interactive menu display system, as used in an embodiment. Among other elements, the administrator portal UI 1900 may include an Administrators control panel 1902, which may for example, present various site configuration settings which may be managed by an owner, a general manager, or other authorized user. The site configuration settings might include for example settings related to access and presentation of the portal UIs 1800 and 1900 as provided by the interactive display menu system 100.

The administrator portal UI 1900 may also include a Users control panel 1904, which may for example, enable the user to add new users 1906 or edit existing users 1908, including managing/setting access levels, restrictions, and/or viewing options. For example, the owner or manager may wish to add a new user when a new employee is hired and grant the new user/employee certain rights and privileges with respect to administration of the menu for the retail establishment. For example, newer employees may initially be granted only viewing privileges and not be able to add to or edit the menu; or, employees under the age of 21 may be denied access or authorization to any configuration settings related to alcoholic beverages offered by the retail establishment; and so on.

The administrator portal UI 1900 may also include a View Logs control panel 1910, which may for example, enable the user to view access logs and other system information related to user activity. The view logs may present an option to select filter options 1912, including for example different types of filters such as pages accessed, login frequency, change log frequency, and other similar administrative log metrics which may be of interest to the owner or manager of the retail establishment.

Example Processes for Providing Menu Display and Configuration User Interfaces

Figure 20:
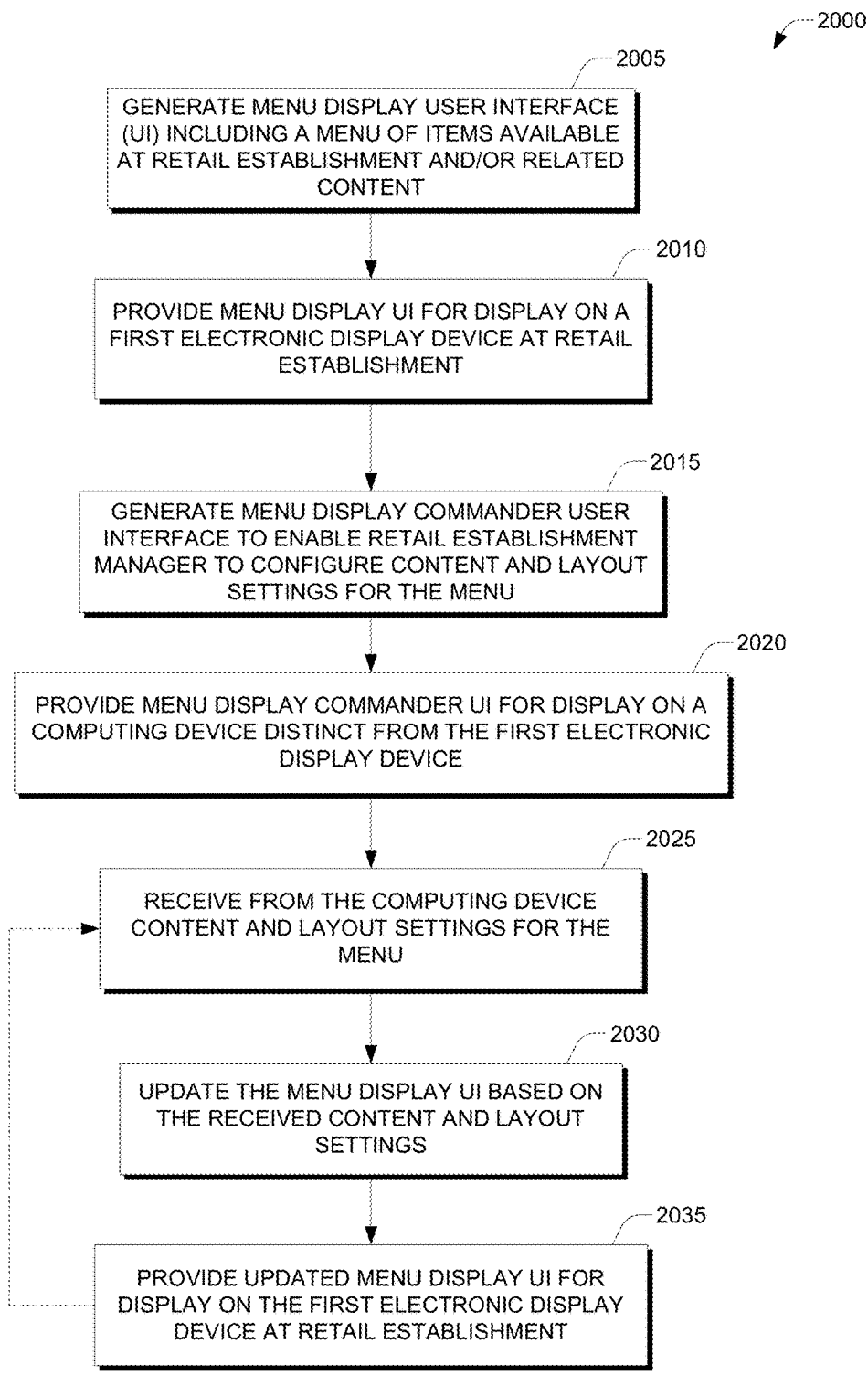
FIG. 20 is a logical flow diagram of an embodiment of a process for providing an interactive menu display using the interactive menu display system of FIG. 1.

FIG. 20 is a logical flow diagram illustrating one embodiment of a process 2000 for providing an interactive menu display, as used in an embodiment. In various embodiments, fewer blocks or additional blocks may be included in the process, or various blocks may be performed in an order different from that shown in FIG. 20. In particular, the blocks in FIG. 20 may be performed by a user computing device 162, the interactive menu display system 100, depending for example on which computing device/software service has access to the required menu content data, for example.

At block 2005 of FIG. 20, the interactive menu display system 100 generates a menu display user interface (UI) including menu of items available at a retail establishment and/or related content such as notices, advertising, and the like. The menu display user interface may be, for example, any of the example display menu user interfaces illustrated and described with reference to FIGS. 2-5 herein. Although the example described with reference to the process 2000 involves one menu display UI, in some embodiments more than one menu display UI may be generated in parallel. For example, in one embodiment a retail establishment may have several display devices to enable display of multiple menu display user interfaces, such as a food display menu, a drinks display menu, and a notice/information display menu, each of which may be generated by the interactive menu display system 100.

At block 2010, the interactive menu display system 100 provides the generated menu display UI for display on a first electronic display device at the retail establishment. In one embodiment, the generated menu display UI is provided directly to the first electronic display device. In another embodiment, the generated menu display UI is provided to an intermediary system, such as another computing system at the retail establishment, which may in turn provide the generated menu display UI to the first electronic display device.

At block 2015, the interactive menu display system 100 may generate a menu display commander user interface to enable an owner or manager of the retail establishment to configure content and layout settings for the menu. The menu display commander user interface may be, for example, any of the example menu configuration user interfaces illustrated and described with reference to FIGS. 6-17 herein. In some embodiments, the menu configuration user interfaces are optimized for display on a portable computing device such as a smart phone or a tablet.

At block 2020, the interactive menu display system 100 provides the menu display commander user interface for display on a computing device distinct from the first electronic display device. For example, the computing device may be a user computing device, such as a smart phone or a tablet, accessible by the owner or manager of the retail establishment.

At block 2025, the interactive menu display system 100 receives from the computing device content and layout settings for the menu. The content and layout settings may include any of the configuration settings described and discussed herein, such as the configuration settings described and discussed with reference to FIGS. 6-17. For example, in response to the user clicking on an "Accept" button or navigating away from a particular menu configuration user interface, the computing device may collect configuration settings data from the menu configuration user interface and send the configuration settings data to the interactive menu display system 100.

At block 2030, the interactive menu display system 100 updates the menu display UI based on the received content and layout settings. For example, if the user updated the menu dimensions and/or layout (e.g., the number and/or arrangement of rows and columns), the menu display UI may be re-generated or updated to reflect the updated menu dimensions and/or layout. In another example, if the user removed an item from the menu (e.g., a beer on tap may have run out and is no longer available, or a limited supply food item may have run out and is no longer available, etc.), the menu display UI may be re-generated or updated to remove the item from the menu display.

At block 2035, the interactive menu display system 100 provides the updated menu display UI for display on the first electronic display device at the retail establishment. In one embodiment interactive menu display system 100 provides the updated menu display UI in near-real time, such that changes or updates made by the owner or manager via the menu configuration UI are propagated to the first electronic display device for display in seconds or less. In one embodiment the first electronic display device replaces the menu display UI with the updated menu display UI immediately after the interactive menu display system 100 provides the updated menu display UI to ensure that the most "current" menu is displayed at any given time.

Once the process 2000 completes blocks 2025 to 2035, the process may be repeated on recurring, continuing, and/or periodic basis so that changes to the menu configuration may be received or detected, and the appropriate menu display user interface(s) may be updated in a timely manner.

Figure 21:
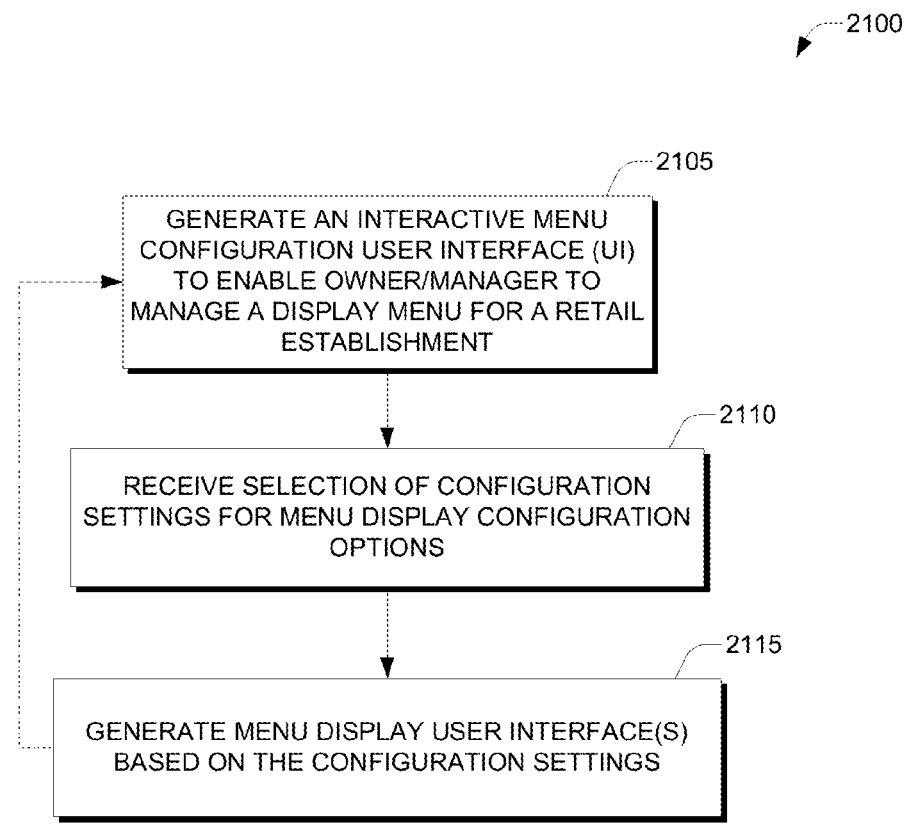
FIG. 21 is a logical flow diagram of an embodiment of a process for generating menu display user interfaces based on configuration settings received via one or more menu configuration user interfaces provided by the interactive menu display system of FIG. 1.

FIG. 21 is a logical flow diagram illustrating a process 2100 for generating menu display user interfaces based on configuration settings received via one or more menu configuration user interfaces provided by the interactive menu display system 100, as used in an embodiment.

At block 2105, the interactive menu display system 100, for example via the user interface module 124, generates an interactive menu configuration user interface to enable an owner or manager of a retail establishment to manage a display menu for the retail establishment. The interactive menu configuration user interface may be, for example, any of the example configuration menu user interfaces illustrated and described with reference to FIGS. 6-17 herein. The interactive menu configuration UI may provide one or more configuration options which the owner or manager can use to edit display menu content (e.g., menu items such as food or drink, notices, advertising or banner content, etc.) and display settings (e.g., layout, colors, images, font styles, etc.).

At block 2110, the interactive menu display system 100 receives a selection of configuration settings for respective menu display configuration options. In one embodiment, the interactive menu display system 100 may receive configuration settings serially for respective menu display configuration options which are presented in respective menu configuration user interfaces. For example, in response to the user clicking on an "Accept" button or navigating away from a respective menu configuration user interface, the interactive menu display system 100 may receive configuration settings data from the respective menu configuration user interface. In another embodiment, the interactive menu display system 100 may receive configuration settings in batches for respective menu display configuration options which are presented in several user interfaces. For example, the interactive menu display system 100 may receive configuration settings data from several of the respective menu configuration user interfaces in response to the user clicking on a "Sync" button in order to synchronize updates to multiple configuration options across several of the respective menu configuration user interfaces.

At block 2115, the interactive menu display system 100 generates one or more menu display user interfaces based on the received configuration settings. The menu display user interfaces may then be provided to, for example, one or more display devices 166 to enable the display devices 166 to present the menu display at the retail establishment. Examples of menu display user interfaces which may be generated and provided by the interactive menu display system 100 are illustrated and discussed with respect to FIGS. 2, 3, 4, and 5 herein.

Once the process 2100 completes blocks 2105 to 2115, the process may be repeated on recurring, continuing, and/or periodic basis so that changes to the menu configuration may be received or detected, and the corresponding menu display user interface(s) may be updated in a timely manner.

Example System Implementation and Architecture

Figure 22:
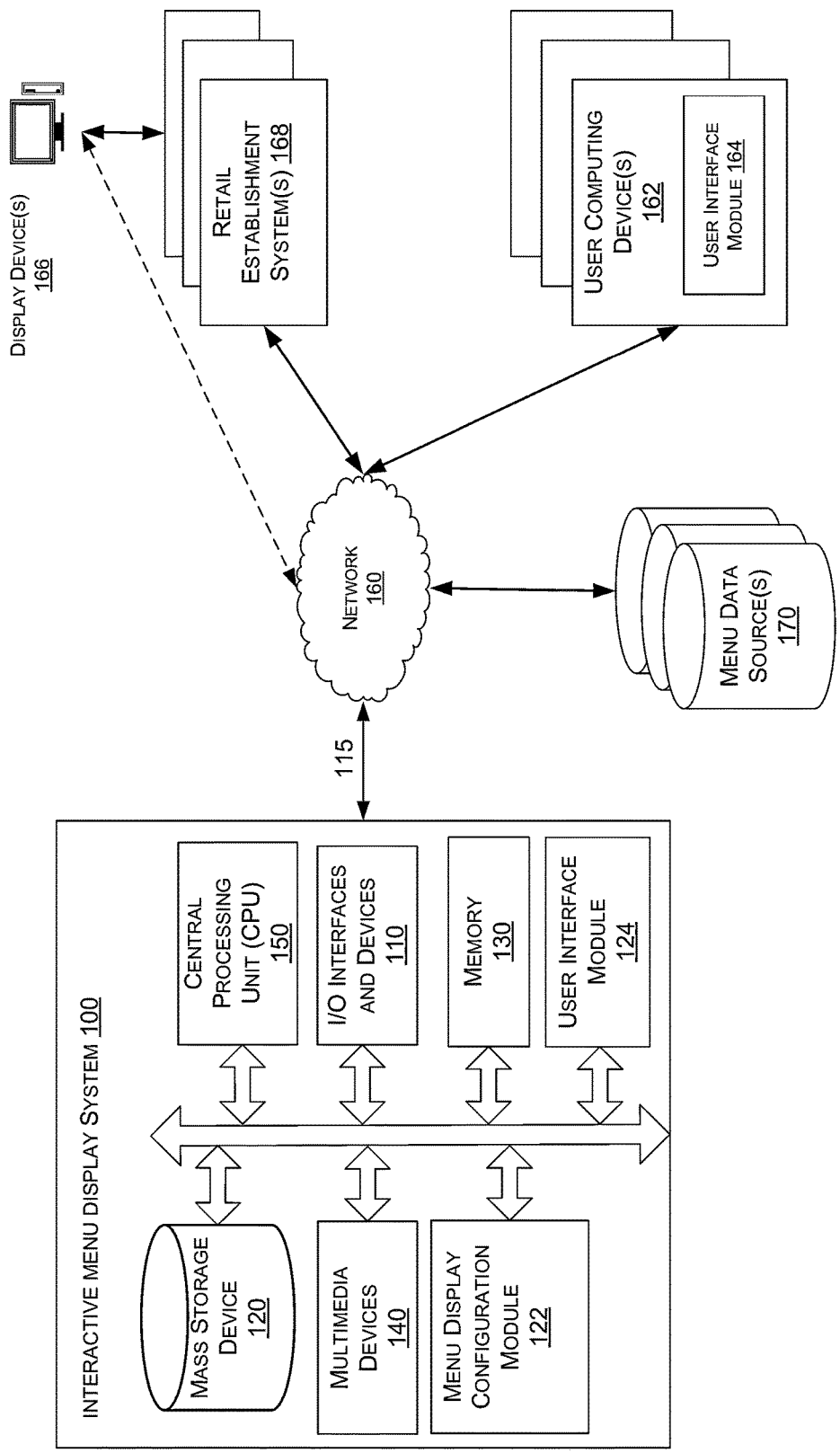
FIG. 22 is a block diagram of an implementation of an illustrative interactive menu display system.

FIG. 22 is a block diagram of an example implementation of an interactive menu display system 100 in communication with a network 160 and various systems, such as user computing device(s) 162 (e.g., a smart phone, a tablet, a laptop, a personal computer, or any other computing device), retail establishment system(s) 168, display device(s) 166, and menu content data source(s) 170. The interactive menu display system 100 may be used to implement systems and methods described herein, including but not limited to the processes 2000 and 2100 of FIGS. 20 and 21, respectively.

The interactive menu display system 100 includes, for example, a personal computer that is IBM, Macintosh, or Linux/Unix compatible or a server or workstation. In one embodiment, the interactive menu display system 100 comprises a server, a laptop computer, a smart phone, a personal digital assistant, a kiosk, or an media player, for example. In one embodiment, the exemplary interactive menu display system 100 includes one or more central processing unit ("CPU") 150, which may each include a conventional or proprietary microprocessor. The interactive menu display system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the interactive menu display system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of interactive menu display system 100 may be combined into fewer components and modules or further separated into additional components and modules.

The interactive menu display system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the interactive menu display system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary interactive menu display system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The interactive menu display system 100 may also include one or more multimedia devices 140, such as speakers, video cards, graphics accelerators, and microphones, for example.

In the embodiment of FIG. 22, the I/O devices and interfaces 110 provide a communication interface to various external devices. In the embodiment of FIG. 22, the interactive menu display system 100 is electronically coupled to a network 160, which comprises one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 22, in some embodiments information may be provided to the interactive menu display system 100 over the network 160 from one or more menu content data sources 170. The menu content data source(s) 170 may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

The menu content data source(s) 170 may store, for example, data for the interactive menu display system, such as information or data about menu items available at a retail establishment including food and drinks; notices including information about upcoming events, special offers for the retail establishment, information about performers and performance schedules, and the like; advertising content, including ads for the retail establishment and/or ads for related products or services which may be displayed on the menu display user interfaces in exchange for a service fee; data related to display settings and/or layout settings for the menu display user interfaces; images and other display content for the menu; and so forth.

In the embodiment of FIG. 22, the interactive menu display system 100 includes a menu display configuration module 122 and a user interface module 124 that may be stored in the mass storage device 120 as executable software codes that are executed by the CPU 150. These and other modules in the interactive menu display system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 22, the interactive menu display system 100 is configured to execute the menu display configuration module 122 and/or the user interface module 124 to perform the various methods and/or processes for mobile sightings data analysis as described herein (such as the processes described with respect to FIGS. 20 and 21 herein). User interface module 124 may generate and render one or more visual user interfaces (such as the user interfaces illustrated and described with respect to FIGS. 2-17).

Retail establishment systems(s) 168 may include a point of sale ("POS") system. Interfacing between the POS system and the interactive menu display system may provide several benefits, including the ability to synchronize menu and content data for menus associated with the retail establishment with data from the POS system, which may include for example menu data related to items for sale at the retail establishment.

Retail establishment systems(s) 168 may also include or be in communication with one or more display device(s) 166 to enable display of the menu display user interfaces described herein. In one embodiment, the interactive menu display system 100 may be in communication with the one or more display device(s) 166, such that the menu display user interfaces may be provided directly from the interactive menu display system 100 to the display device(s). In another embodiment, the interactive menu display system 100 may be in communication with the retail establishment system(s) 168, such that the menu display user interfaces may be provided indirectly from the interactive menu display system 100 to the display device(s) through the retail establishment system(s) 168.

Embodiments can be implemented such that all functions illustrated herein are performed on a single device, while other embodiments can be implemented in a distributed environment in which the functions are collectively performed on two or more devices that are in communication with each other. Moreover, while the computing system has been used to describe one embodiment of interactive menu display system 100, it is recognized that the user systems may be implemented as computing systems as well.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the interactive menu display system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include systems, data, objects, devices, components, or modules not stored locally, that are not accessible via the local bus. Thus, remote data may include a system which is physically stored in the same room and connected to the computing system via a network. In other situations, a remote device may also be located in a separate geographic area, such as, for example, in a different location, country, and so forth.

Other Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. For example, a feature of one embodiment may be used with a feature in a different embodiment. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A system for configuring a menu displayed on a display device, the menu being configurable from a remote user computing device, the system comprising:
   a central processor;
   a data networking interface controlled by the central processor and in communication with the remote user computing device and the display device;
   a data storage that stores menu configuration data, menu layout data, and menu item data associated with the menu;
   a menu display configuration module stored on a server and implemented as a series of instructions executed by the central processor to interface with the data storage and manage input of, and modifications to, the menu configuration data, the menu layout data, and the menu item data thereon; and
   a user interface server module implemented as a series of instructions executed by the central processor that separately generates a menu configuration user interface including one or more input fields receptive to data corresponding to the menu configuration data, the menu configuration user interface including, on a first screen thereof, one or more input fields receptive to data corresponding to the menu layout data including a menu row and column configuration, an alignment setting, a setting which allows for a user to jump directly from one screen of the user interface to a second screen of the user interface using a user input command, and a command popover option which, when selected, creates a popover window over a pre-existing view, wherein the popover window includes one or more options to configure the menu to rotate, scroll, or page through a pattern of displaying a selected number of a plurality of items at one time, and, on a second screen of the menu configuration user interface, one or more input fields receptive to data corresponding to the menu item data including a title for a single menu item, a price of the single menu item, a graphical image of the single menu item, a preview field that dynamically displays the graphical image, and a command which synchronizes menu item data across point of sale, display, and website systems, the menu configuration user interface generated by the central processor, the menu configuration user interface being displayable on the remote user computing device;
   wherein the user interface server module generates the menu for presentation on the display device in accordance with the menu configuration data, the menu layout data, and the menu item data from the data storage separate and independently from the generating of the menu configuration user interface.

2. The system of claim 1, wherein the generated menu configuration user interface is transmitted to the remote user computing device for display thereon.

3. The system of claim 1, wherein the first screen of the generated menu configuration user interface is transmitted to the remote user computing device for display thereon.

4. The system of claim 1, wherein the second screen of the generated menu configuration user interface is transmitted to the remote user computing device for display thereon.

5. The system of claim 1, wherein the remote user computing device includes a user interface client module in communication with the user interface server module.

6. The system of claim 5, wherein the user interface server module generates, on demand, a menu configuration user interface command and sends the menu configuration user interface command to the user interface client module of the remote user computing device, and in response to the menu configuration user interface command, the user interface client module generates the menu configuration user interface for display on the remote user computing device.

7. The system of claim 5, wherein the user interface server module generates, on demand, a menu layout configuration user interface command, and sends the menu layout configuration user interface command to the user interface client module of the remote user computing device, and in response to the menu layout configuration user interface command, the user interface client module generates the first screen of the menu configuration user interface for display on the remote user computing device.

8. The system of claim 5, wherein the user interface server module generates, on demand, a menu item configuration user interface command, and sends the menu item configuration user interface command to the user interface client module of the remote user computing device, and in response to the menu item configuration user interface command, the user interface client module generates the second screen of the menu configuration user interface for display on the remote user computing device.

9. The system of claim 1, wherein the user interface server module generates a user selectable control to enable synchronization of either one or more of the menu configuration data, the menu layout data, and the menu item data to a corresponding one or more input fields accessible by the remote user computing device to enable updates thereto.

10. The system of claim 1, wherein the second screen of the menu configuration user interface includes one or more of:
- a description user input control to enable the user to provide a description for the single menu item,
- a horizontal alignment user control to enable a user to specify a horizontal alignment position for the single menu item in a layout associated with the menu,
- a vertical alignment user control to enable the user to specify a vertical alignment position for the single menu item in the layout associated with the menu,
- an option to delete the single menu item from the menu,
- an option to add a new item before the single menu item in the layout associated with the menu,
- an option to add a new item after the single menu item in the layout associated with the menu,
- an option to view a previous item, or
- an option to view a next item.

11. The system of claim 1, further comprising a point of sale interface control element configured to display one or more configuration options for a point of sale system associated with a retail establishment.

12. The system of claim 11, wherein the menu configuration data, the menu layout data, and the menu item data in the data storage is synchronized with the menu configuration data, the menu layout data, and the menu item data in the point of sale system.

13. The system of claim 1, wherein an item defaults interface control element is generated by the user interface server module, one or more item default configuration options for the menu being displayed in response to invoking the item defaults interface control element.

14. The system of claim 13, wherein the one or more item default configuration options for the menu includes at least a menu grid input control to enable the user to specify whether a grid for the menu should be displayed, a rows user input control to enable the user to specify a number of rows for a layout associated with the menu, and a columns user input control to enable the user to specify a number of columns for the layout associated with the menu.

15. The system of claim 13, wherein the one or more item default configuration options for the menu includes a horizontal alignment default style for single menu items in the menu.

16. The system of claim 1, further comprising a background display control element configured to display one or more configuration options associated with a background display of the menu.

17. The system of claim 1, wherein the menu configuration user interface generated by the user interface server module includes a ticker content control element configured to display one or more configuration options associated with a scrolling ticker display portion of the menu.

18. The system of claim 17, wherein the one or more configuration options associated with the scrolling ticker display portion of the menu includes a social media feed URL user input element, one or more standard ticker value user input elements, and a ticker type selector element.

19. The system of claim 1, wherein the menu configuration user interface further includes at least a banner content control element configured to display one or more configuration options associated with a banner content display overlay of the menu.

20. The system of claim 19, wherein the one or more configuration options associated with the banner content display overlay is scheduling presentation thereof based upon time of day.

* * * * *